US012710626B2

(12) United States Patent
Attar et al.

(10) Patent No.: US 12,710,626 B2
(45) Date of Patent: Aug. 18, 2026

(54) ANAMORPHIC LENS SYSTEM WITH LENS MOUNTING STRUCTURES

(71) Applicant: Glass Imaging Inc., Los Altos, CA (US)

(72) Inventors: Ziv Attar, Los Altos, CA (US); Cole Alexander Cogswell, San Carlos, CA (US)

(73) Assignee: Glass Imaging Inc., Los Altos, CA (US)

( * ) Notice: Subject to any disclaimer, the term of this patent is extended or adjusted under 35 U.S.C. 154(b) by 339 days.

(21) Appl. No.: 18/504,060

(22) Filed: Nov. 7, 2023

(65) Prior Publication Data

US 2024/0151950 A1 May 9, 2024

Related U.S. Application Data

(60) Provisional application No. 63/585,179, filed on Sep. 25, 2023, provisional application No. 63/423,196, filed on Nov. 7, 2022.

(51) Int. Cl.
*G02B 13/08* (2006.01)
*G02B 7/02* (2021.01)

(52) U.S. Cl.
CPC ............ *G02B 13/08* (2013.01); *G02B 7/021* (2013.01)

(58) Field of Classification Search
CPC .... G03B 21/142; G03B 21/147; G03B 27/68; G03B 17/12; G03B 2205/00–0038; G02B 26/0875–0891
See application file for complete search history.

(56) References Cited

U.S. PATENT DOCUMENTS

| | | | | |
|---|---|---|---|---|
| 3,898,451 A * | 8/1975 | Murphy | .................. | H01K 9/08 313/115 |
| 4,662,717 A | 5/1987 | Yamada et al. | | |
| 8,049,967 B2 * | 11/2011 | Hirose | .................. | G02B 13/08 359/671 |

(Continued)

FOREIGN PATENT DOCUMENTS

| | | |
|---|---|---|
| CN | 114859442 A | 8/2022 |
| KR | 2010-0030523 A | 3/2010 |

OTHER PUBLICATIONS

PCT International Search Report and Written Opinion, PCT Application No. PCT/US2023/078969, Mar. 5, 2024, nine pages.

*Primary Examiner* — Thomas K Pham
*Assistant Examiner* — Ruby L Kauffman
(74) *Attorney, Agent, or Firm* — Fenwick & West LLP

(57) ABSTRACT

A system may include first lens with a first optical component and a first mounting structure having a first wall on a first side and a second wall on second side, each wall having a gap. The system may further include a second lens that interlocks with the first lens. The second lens includes a second optical component and a second mounting structure that engages with the first mounting structure. The second mounting structure has a first barrier with a first protrusion and a second barrier with a second protrusion. The first and second protrusions positioned complementary to the gaps of the first mounting structure and configured to engage with the gaps, where engagement of the protrusions into the gaps provides passive rotational alignment of the optical components about the optical axis.

20 Claims, 20 Drawing Sheets

(56) References Cited

U.S. PATENT DOCUMENTS

| | | | | |
|---|---|---|---|---|
| 2005/0030647 | A1* | 2/2005 | Amanai | G02B 13/0085 359/798 |
| 2005/0068456 | A1* | 3/2005 | Ohta | H10F 39/804 348/360 |
| 2006/0140623 | A1* | 6/2006 | Yu | H04N 23/55 396/529 |
| 2006/0221469 | A1* | 10/2006 | Ye | G02B 7/021 359/811 |
| 2012/0147489 | A1* | 6/2012 | Matsuoka | G02B 7/025 359/819 |
| 2021/0325626 | A1 | 10/2021 | Chen et al. | |
| 2022/0360751 | A1* | 11/2022 | Greenstein | G02B 27/0955 |

* cited by examiner

Anamorphic Lens System 100

Anamorphic
Lens System
100

Lens System
500

ANAMORPHIC LENS SYSTEM WITH LENS MOUNTING STRUCTURES

CROSS REFERENCE TO RELATED APPLICATION

This application claims the benefit of, and priority to, U.S. Provisional Application No. 63/423,196, "Integrated rotationally self alignment features for lens to lens alignment in an anamorphic imaging module," filed on Nov. 7, 2022 and U.S. Provisional Application No. 63/585,179, "Self-Aligning Lens Structure with Radial Grooves and Toroidal Protrusions," filed on Sep. 25, 2023, each of which is incorporated herein by reference in its entirety.

FIELD OF ART

The disclosure generally relates to the field of lens systems and, in particular, to aligning lens systems with asymmetric lenses.

BACKGROUND

Conventional lens systems include external mechanical support structures (e.g., a lens barrel) to align and hold lenses in place. However, aligning the lenses using these external structures can be tedious. Furthermore, the final alignment of the lenses can be inaccurate, especially for asymmetric lenses which may need be rotationally aligned (relative to each other) about the optical axis in addition to along the optical axis to form a focused image. Furthermore, maintaining rotational alignment via an external support can be difficult, especially if the lens system is installed in a device prone to sudden movements, such as installed in a phone or virtual reality headset.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1A:
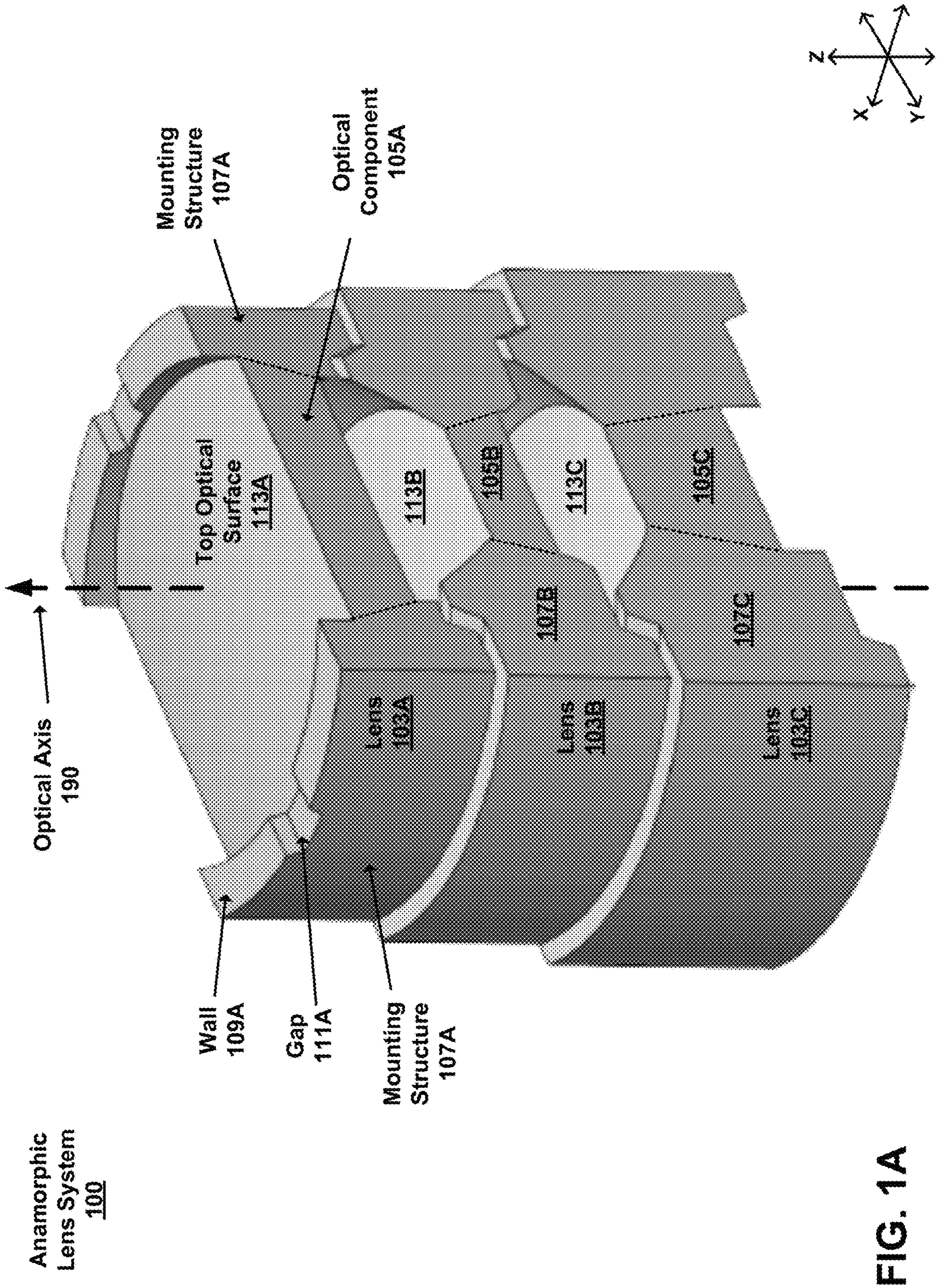
FIGS. 1A-1D are diagrams illustrating an anamorphic lens system, according to one or more embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Conventional lens systems include external mechanical support structures (e.g., a lens barrel) to align and hold lenses in place. However, using these external support structures to align the lenses can be tedious. Furthermore, the end alignment of the lenses by these external support structures can be inaccurate (e.g., due to the inaccurate manufacturing tolerances of the external supports), especially for asymmetric lenses (lenses that have a surface asymmetrical about the optical axis) which may need to be rotationally aligned (relative to each other) about the optical axis in addition to along the optical axis to form a focused image. Furthermore, maintaining rotational alignment via an external support can be difficult. This may be particularly difficult if the lens system is installed in a device prone to sudden movements, for example, in a phone or virtual reality headset.

Embodiments described herein address these and other issues by describing lenses with mounting structures configured to interlock with the mounting structures of adjacent lenses. The mounting structures may provide rotational alignment about the optical axis, lateral alignment perpendicular to the optical axis, linear alignment along the optical axis, or some combination thereof.

In some aspects, the techniques described herein relate to an anamorphic lens system including: a first lens including: a first optical component having a first optical surface with a curvature asymmetrical about an optical axis; and a first mounting structure configured to engage with a mounting structure of an adjacent lens, the first mounting structure having a first wall on a first side and a second wall on second side, each wall having a gap, the first wall and the second wall being opposite each other on the first mounting structure; and a second lens configured to interlock with the first lens, the second lens including: a second optical component having a second optical surface with a curvature asymmetrical about the optical axis; and a second mounting structure configured to engage with the first mounting structure, the second mounting structure having a first barrier with a first protrusion and a second barrier with a second protrusion, the first barrier and the second barrier being opposite each other on the second mounting structure, the first and second protrusions positioned complementary to the gaps of the first mounting structure and configured to engage with the gaps, engagement of the protrusions into the gaps providing passive rotational alignment of the first and second asymmetrical surfaces about the optical axis.

Other aspects include components, devices, systems, improvements, methods, processes, applications, computer readable mediums, and other technologies related to any of the above.

Anamorphic Lens Systems

Figure 1B:
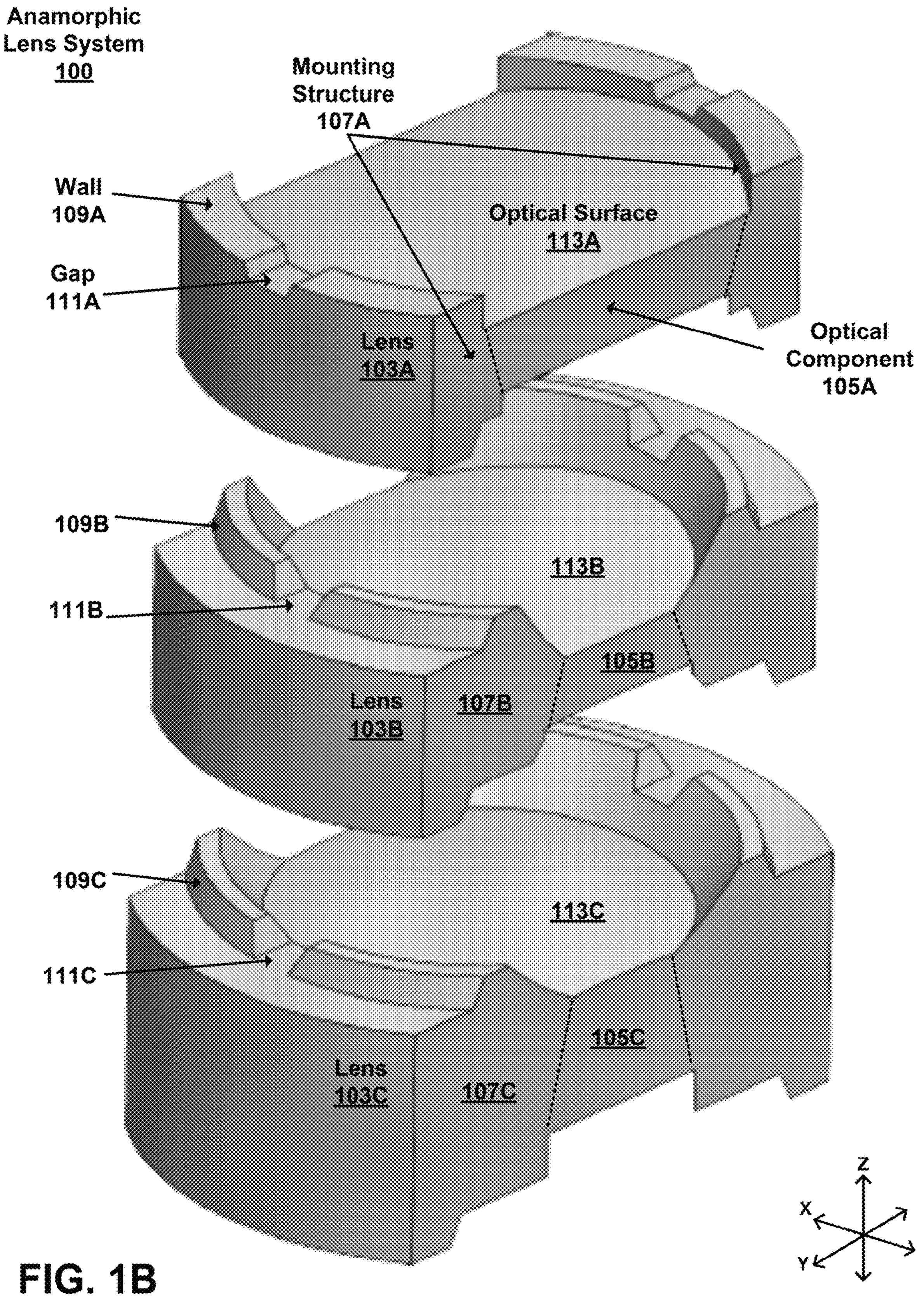
Figure 1C:
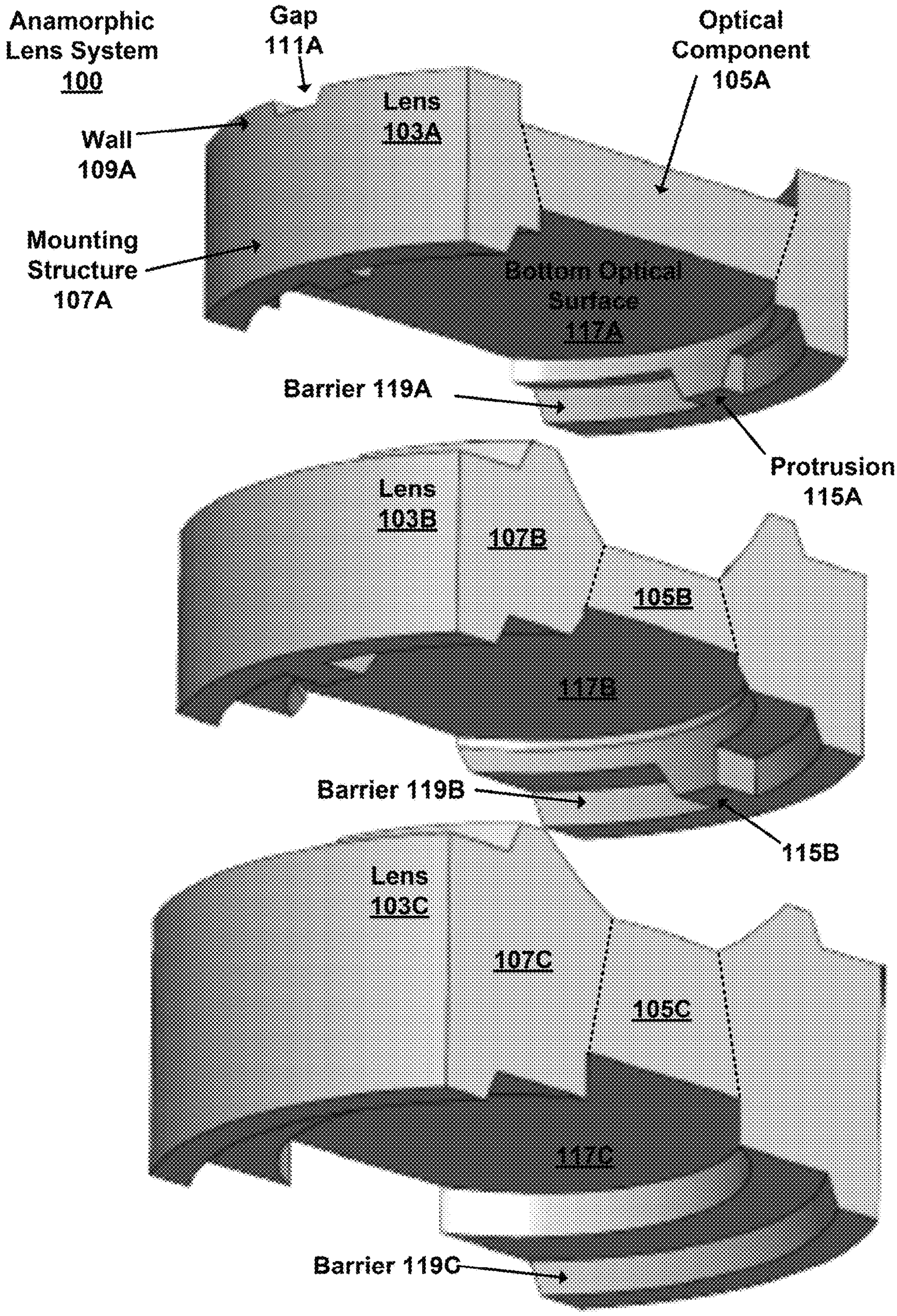
Figure 1D:
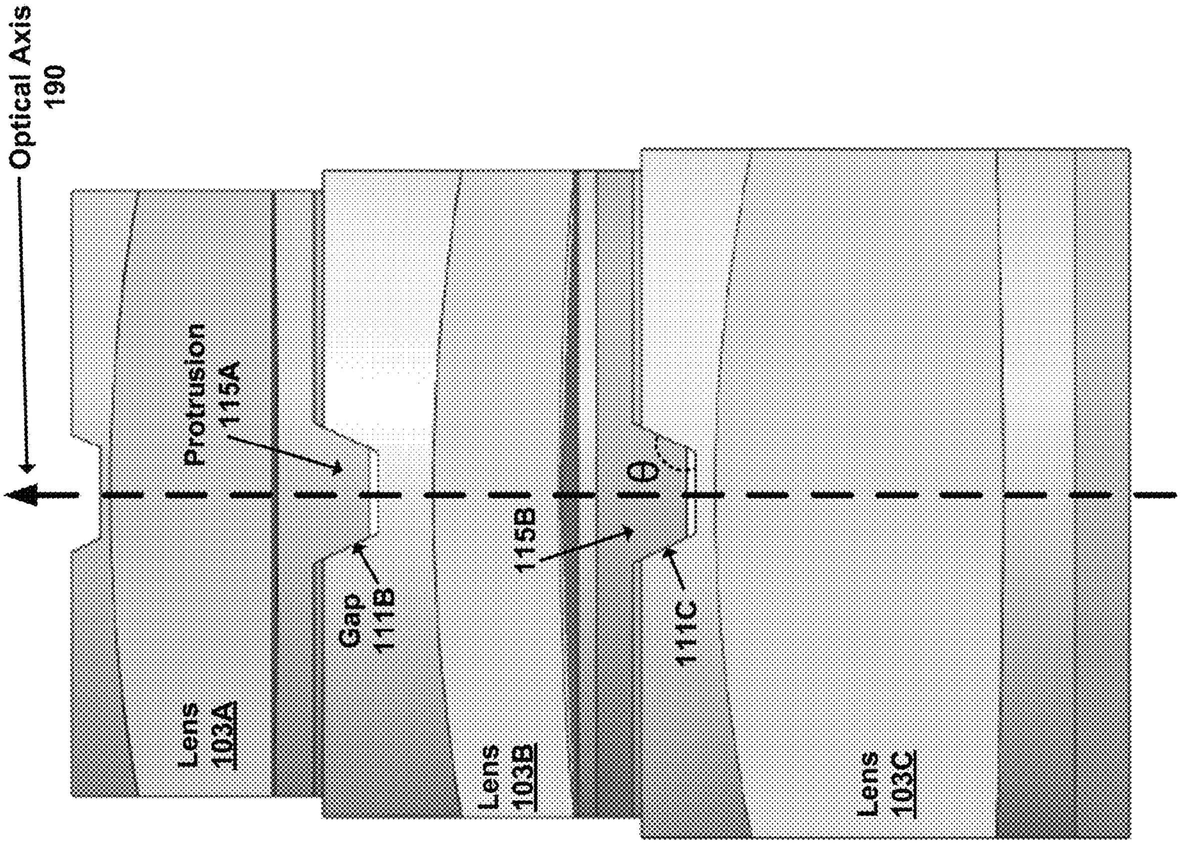

FIGS. 1A-1D (collectively referred to as FIG. 1) are diagrams illustrating an anamorphic lens system 100 according to one or more embodiments. Specifically, FIG. 1A is a perspective diagram of the anamorphic lens system 100 (from an elevated perspective); FIG. 1B is an exploded perspective diagram of the anamorphic lens system 100 (from an elevated perspective); FIG. 1C is another exploded perspective diagram of the anamorphic lens system 100 (from a low-angle perspective); and FIG. 1D is a cross-sectional view of the anamorphic lens system 100.

In the example of FIG. 1, the anamorphic lens system 100 includes three lenses, labeled 103A-C, along an optical axis 190. Lens 103A is the smallest of the three while lens 103C is the largest of the three (as measured along each of the x, y, and z axes), however this is not required. For example, any of the three lenses may be the same size or a different size along any of the axes. Lens 103A is the top lens and it includes an optical component 105A and a mounting structure 107A on two sides of the optical component 105A. The optical component 105A includes a top optical surface 113A and a bottom optical surface 117A. The mounting structure 107A includes a wall 109A with a gap 111A on a top portion. The mounting structure 107A also includes a barrier 119A with a protrusion 115A on a bottom portion. As illustrated in FIG. 1, the shape and structure of lens 103A is symmetric about the x-axis and the y-axis (however the optical surfaces 113A and 117A may or may not have curvatures that are symmetric about these axes). However, this is not required. For example, the gap on a first side (e.g., 111A) may not be at a symmetrically opposite position as the gap on the second side. Lenses 103B and 103C are shaped similar to lens 103A and have similar components as lens 103A (with reference labels ending in "B" and "C", respectively).

As used herein, like components may be collectively referred to using a reference number without an end letter (e.g., optical components 105A-C may be referred to as "optical components 105"). Furthermore, the terms "top," "bottom," "above," and "below" are used herein merely for convenience to refer to lens components relative to other lens components. The anamorphic lens system 100 is not required to be in a vertical position with lens 103A being on top and lens 103C being on bottom (e.g., depending on the optical surfaces 113 and the direction of light, lens 103A may be on the bottom and lens 103C may be on the top).

An optical component (e.g., 105A) includes two surfaces (e.g., 113A and 117A) that direct light along the optical axis 190. An optical component may be transmissive and may focus or disperses light by means of refraction. For example, the optical components 105 together focus light to form an image on an image sensor. An example optical component is a lens.

As mentioned above, the system 100 is an anamorphic system, which means the system 100 has different optical powers along different focusing axes (e.g., the x and y axes). Said differently, the system 100 has different focal lengths along the focusing axes. To achieve this, the anamorphic lens system 100 may include one or more optical surfaces with curvatures that are not rotationally symmetric about the optical axis 190 (said differently, the surface curvatures are asymmetric about the optical axis 190). An example of an asymmetric lens is a cylindrical lens, which has a curved surface along one axis and no curvature along a second (perpendicular) axis. However, lens systems described are not required to be anamorphic or to include asymmetric surfaces. For example, some embodiments include lenses with optical components with symmetrical surfaces.

Having only one asymmetrical optical surface may result in the system 100 having a different focal length along one axis but it may also result in the system 100 having a different focus plane along that axis, which may make it difficult or impossible to focus light such that it forms an image at a plane (e.g., on an image sensor). Thus, in some embodiments, the system 100 includes least two asymmetrical surfaces, which can result in the system 100 having different magnifications along two axes with both dimensions being focused on the same plane. The at least two asymmetrical surfaces may be part of the same lens (e.g., surfaces 113A and 117A) or spread out across two or more lenses (e.g., 113A, 113B, and 117C).

If two or more of the lenses 103 include asymmetrical optical surfaces, then relative alignment of the lenses about the optical axis 190 (parallel to the z axis in this case) may be helpful (e.g., important) to achieve the desired optical effect. If the asymmetric optical surfaces are not aligned (e.g., 0.01-0.05 degrees out of alignment), then the resulting optical image may be blurry or ineffective for its intended use. Alignment of the lenses may be achieved using the mounting structures 107 as further described below.

The mounting structures 107 are configured to interlock with mounting structures of adjacent lenses, thus enabling the lenses 103 to stack on top of each other and maintain optical alignment. Specifically, bottom portions of the mounting structures 107 are generally configured to engage with top portions of adjacent mounting structures (e.g., the bottom portion of 107A engages with the top portion of 107B).

The mounting structures 107 are on peripheral portions of the optical components 105. In the example of FIG. 1, each mounting structure is on two sides which are opposite the optical components. A mounting structure on two opposite sides may help the lenses interlock with ease when the lenses are brought together. However, the mounting structures 107 are not required to be on two sides that are opposite each other. Additionally, the mounting structures 107 may be on fewer or additional sides (e.g., 1, 3, or 4 sides in total) of the optical components 105. In some embodiments, a mounting structure may extend around the entire periphery of an optical component. For example, see FIGS. 5A-5D.

Top portions of the mounting structures 107 include a wall (e.g., 109A) with a gap (e.g., 111A) on a first side (e.g., the +y side in FIG. 1A). The opposite side of the top portion also includes a wall with a gap (e.g., see the −y side in FIG. 1A), since the lenses 103 may be symmetric about the x and y axes as previously stated. More specifically, the walls 109 of each lens are on opposite sides of the optical components 105, and the gaps are on opposite sides as well (however this is not required). As illustrated, the walls 109 extend upward along the optical axis 190 (said differently, parallel to the optical axis 190) and also extend along the peripheries of the optical components 105. The thickness of a wall may decrease or stay the same when moving along the +z direction. The thickness of a wall may stay the same as it extends along the periphery of an optical component. Furthermore, a wall may have a curved shape along the periphery. In some configurations or embodiments, a wall may be referred to as a "rotationally symmetric groove" or a "toroidal protrusion." Note that, in the example of FIG. 1, the top lens 103A includes walls with gaps. However, in some embodiments, the top lens 103A may not include walls (e.g., if no other lenses will be added to the top of the lens system 100).

The terms "parallel" and "perpendicular" as used herein may refer to components being "substantially" parallel or "substantially" perpendicular (e.g., within two degrees) since manufacturing components that are perfectly parallel or perpendicular may be practically difficult to achieve.

Bottom portions of the mounting structures 107 include a barrier (e.g., 119A) on a first side (e.g., the +y side in FIG. 1A) and a second barrier on the opposite side (e.g., the −y side in FIG. 1A). Each of the barriers 119 may include a protrusion (e.g., 115B). More specifically, the barriers 119 and protrusions of each lens 103 may be on opposite sides of the corresponding optical component. As illustrated, the barriers 119 extend downward along the optical axis 190 (said differently, parallel to the optical axis 190) and also extend along the peripheries of the optical components 105. The thickness of a barrier may decrease or stay the same when moving along the −z direction. The thickness of a barrier may stay the same as it extends along the periphery of an optical component. Furthermore, a barrier may have a curved shape along the periphery. The protrusions 115 extend from inner surfaces of the barriers 119 toward the optical components 105. Due to the x axis symmetry, on a given lens, the pair of protrusions extend toward each other as well (however, this is not required). In some situations or embodiments, a protrusion may be referred to as a "non-concentric and/or rotationally non-symmetric geometric feature."

In the example of FIG. 1, each mounting structure only includes two gaps (one on each side) and two protrusions (one on each side), however mounting structures 107 may include more or fewer gaps. Similarly, mounting structures 107 may include more or fewer protrusions (assuming sufficient gaps in the corresponding walls to receive them). Additionally, the walls 109 are not required to be on top portions and the barriers 119 and the protrusions 115 are not required to be on bottom portions of the mounting structures 107. In some embodiments, the walls 109 are on bottom portions and the barriers 119 and 115 are on top portions.

As illustrated, the protrusions 115 of the lenses are positioned complementary to gaps 111 of adjacent lenses, thus enabling pairs of protrusions 115 to engage with pairs of gaps 111 when the lenses 103 are brought together into physical contact (e.g., during an installation process). Engagement of the protrusions 115 with gaps 111 is illustrated in FIG. 1D. As illustrated, protrusions of the top and middle lenses are respectively received by gaps of the middle and bottom lenses. Among other advantages, engagement of protrusions from a top lens into gaps of a bottom lens prevents (or reduces (e.g., within 0.01 degrees)) lens rotation about the optical axis 190. Thus, the protrusions and gaps enable rotational alignment of the lenses about the optical axis 190. More specifically, this enables the asymmetric surfaces to stay rotationally aligned relative to each other, thus enabling the system 100 to produce focused images. This alignment is passive, meaning, when the structures are correctly brought together, the structures themselves can enable and maintain alignment without active intervention (as long as the lenses 103 are held together). Furthermore, the system 100 may not need any mechanism to adjust the lenses relative to each other during installation in a device or during operation of that device. In other words, as long as the lenses are interlocked and held together, they may maintain alignment.

Similarly, the walls 109 of top portions are configured to engage with the barriers 119 of the bottom portions. Specifically, an outer surface (facing away from the optical component) of a wall of a bottom lens is configured to engage with an inner surface (facing toward the optical component) of a barrier of a top lens. Engagement of wall outer surfaces with barrier inner surfaces is partially illustrated in FIG. 1A. Specifically, the barriers of the top and middle lenses are respectively in contact with walls of the middle and bottom lenses. Due to the positioning and shapes of the walls and barriers (e.g., their curvature), engagement of the walls and barriers prevents (or reduces) lateral movement (movement along the x and y axes) of a top lens relative to a bottom lens. Thus, the walls and barriers enable passive lateral centering alignment of the lenses. Lateral alignment may also be achieved by repositioning the walls and barriers so that barrier outer surfaces are configured to engage with wall inner surfaces.

Furthermore, the interlocking mounting structures 107 may provide linear lens alignment along the optical axis 190 in addition to, or alternative to, the rotational alignment and lateral alignment described above. Said differently, the mounting structures 107 may be configured to keep the lenses 103 spaced apart at predetermined distances so that the system 100 form an image when light passes through the system 100.

Note that that shape and size of the components for each lens may not be identical. For example, the thickness and length of wall 109A may be different than the thickness and length of wall 109C. Furthermore, one or more lenses may have different components (e.g., lack one or more components). For example, lens 103C does not include a protrusion (since there are no lenses below lens 103C).

Figure 2A:
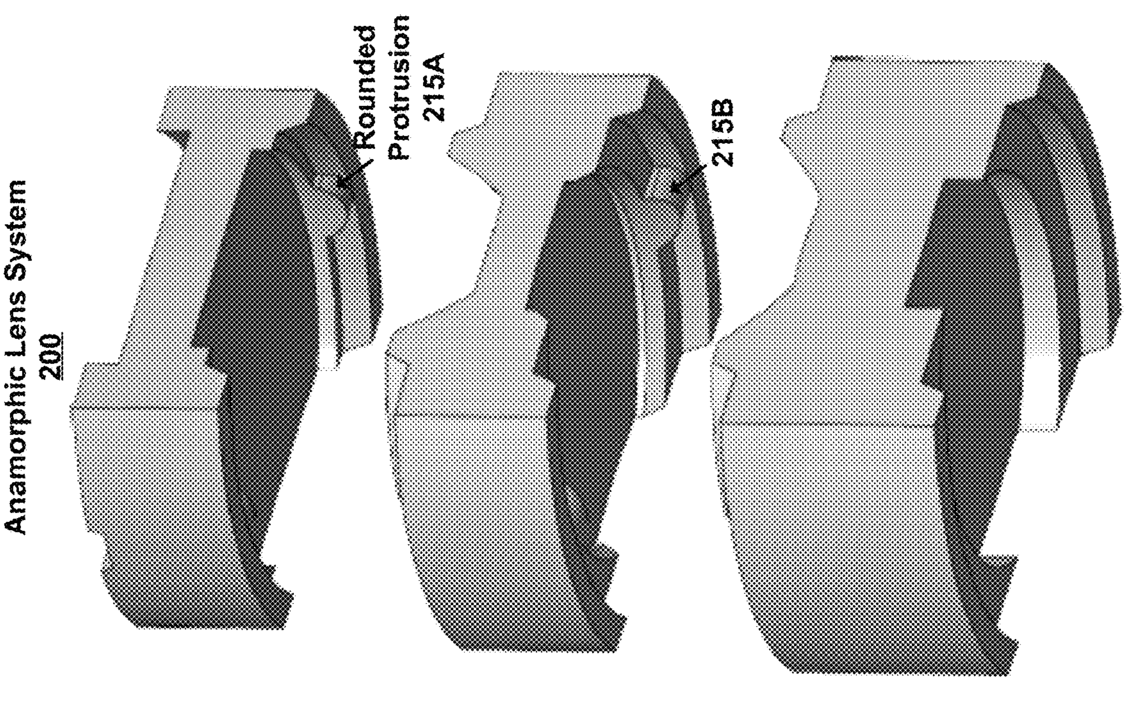
FIGS. 2A-2B are diagrams illustrating another anamorphic lens system according, to one or more embodiments.
Figure 2B:
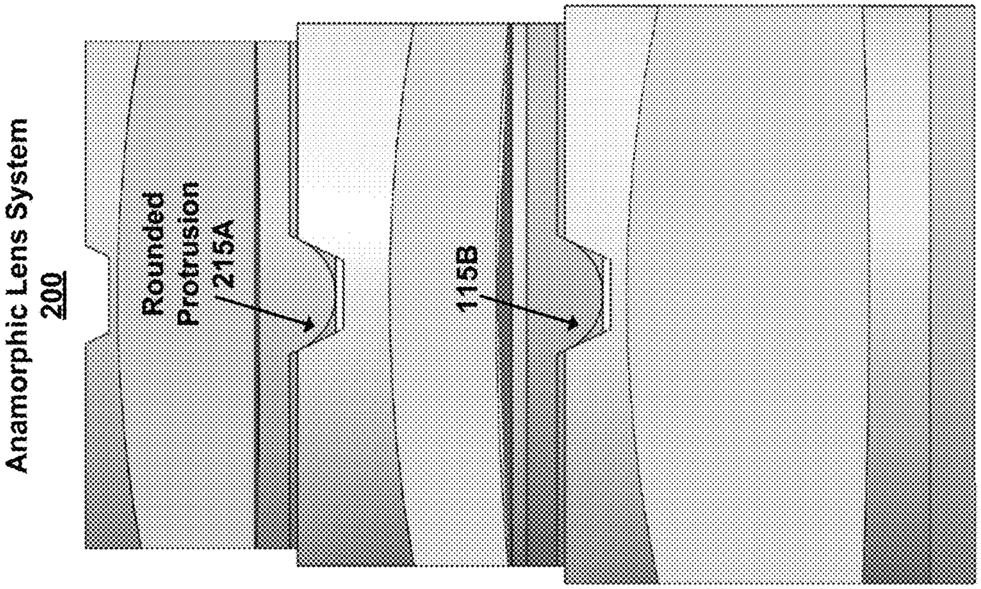

In the example of FIG. 1, the protrusions 115 have corners and are generally rectangular in shape, however this is not required. For example, the protrusions may be rounded, as illustrated in FIGS. 2A and 2B. FIGS. 2A and 2B are diagrams of an anamorphic lens system 200 with rounded protrusions 215A and 215B, according to some embodiments. Specifically, FIG. 2A is an exploded perspective diagram of the anamorphic lens system 200 (from a low angle perspective) and FIG. 1B is a cross-sectional view of the anamorphic lens system 200.

Figure 5A:
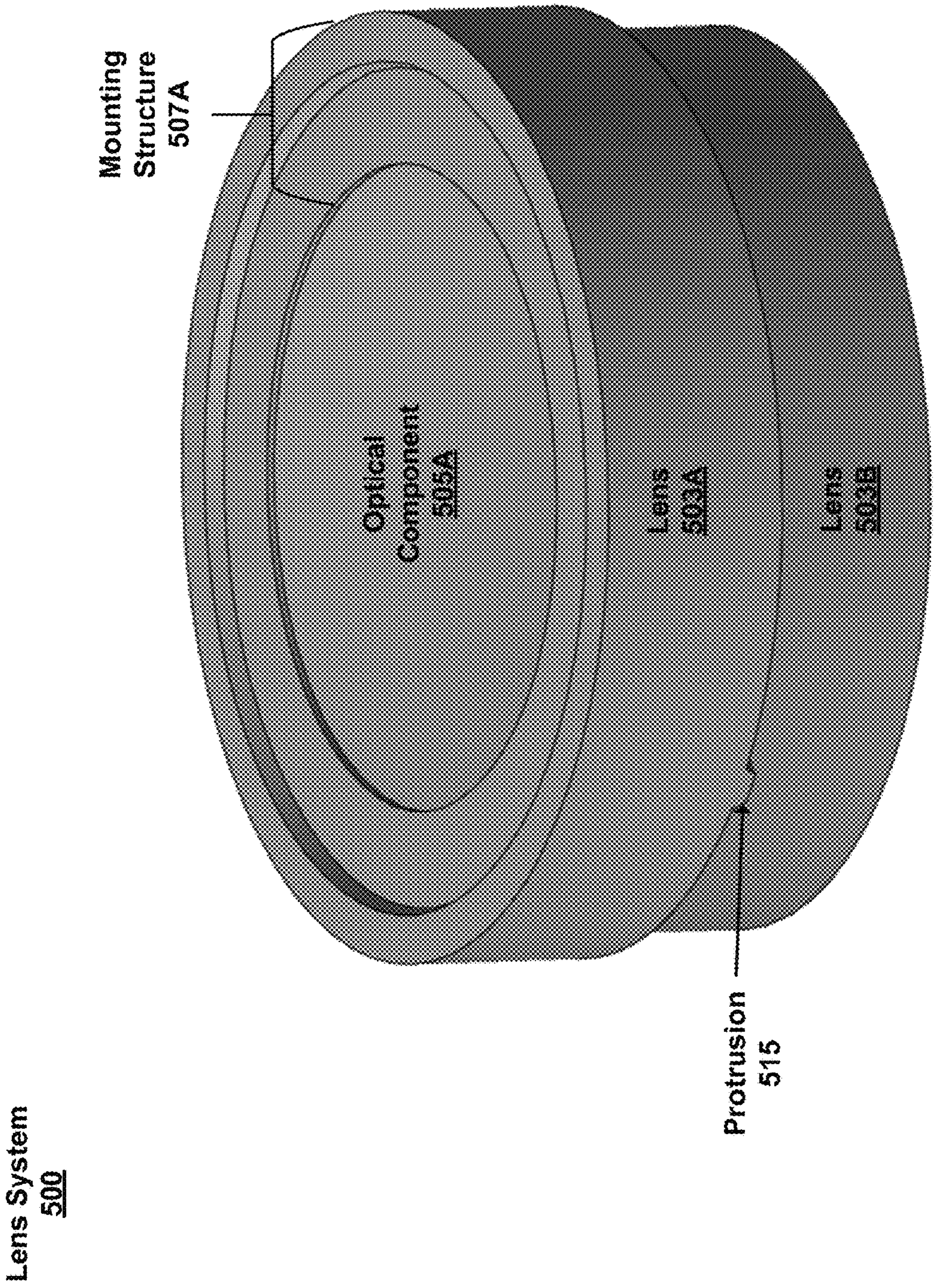
FIGS. 5A-5D are diagrams of an anamorphic lens system with interlocking mounting structures that span around the entire periphery of the lens components, according to one or more embodiments.
Figure 5B:
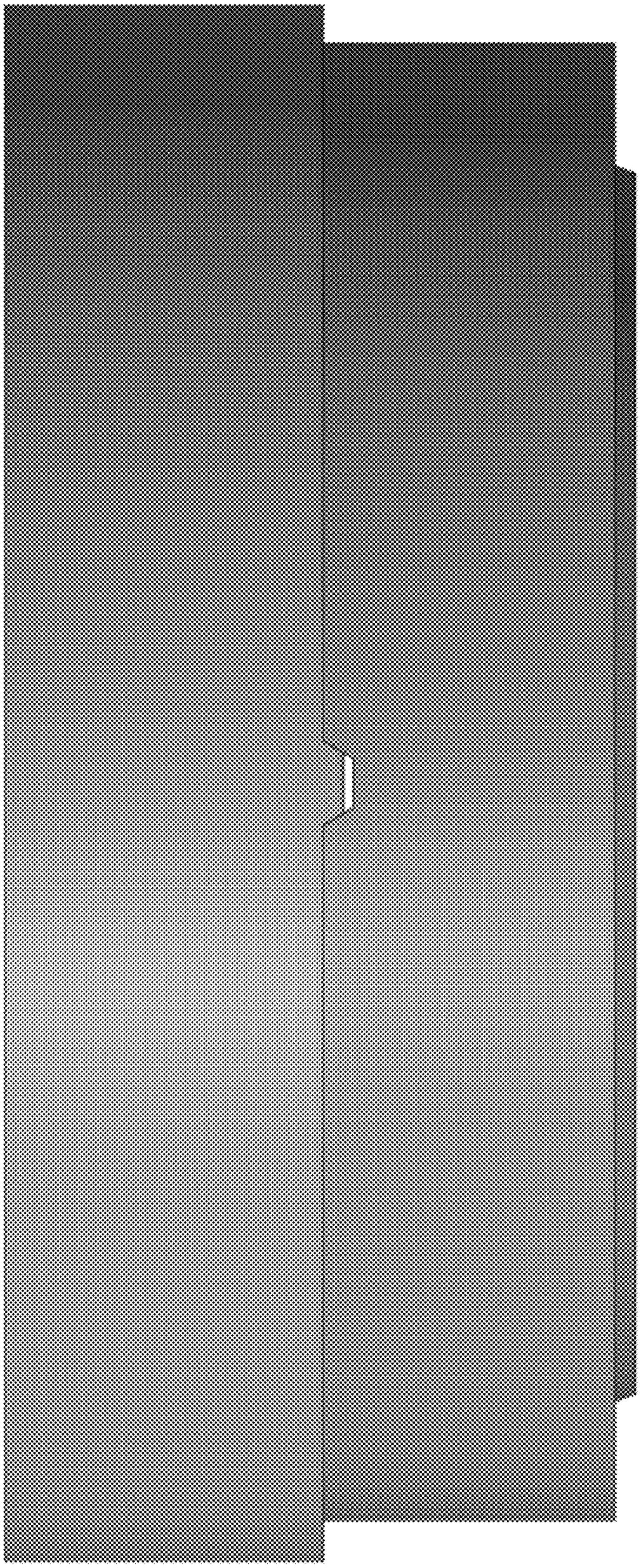
Figure 5C:
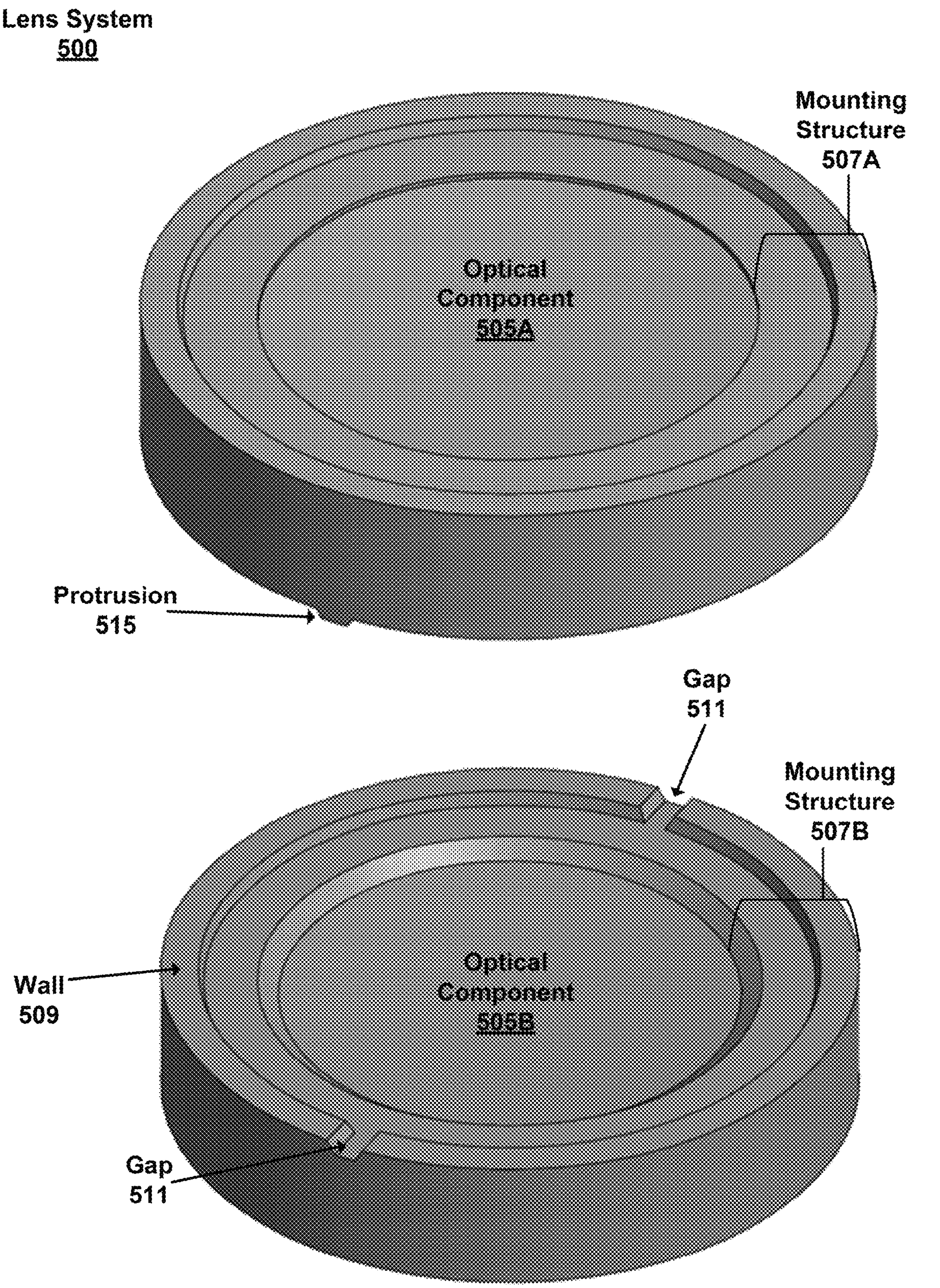
Figure 5D:
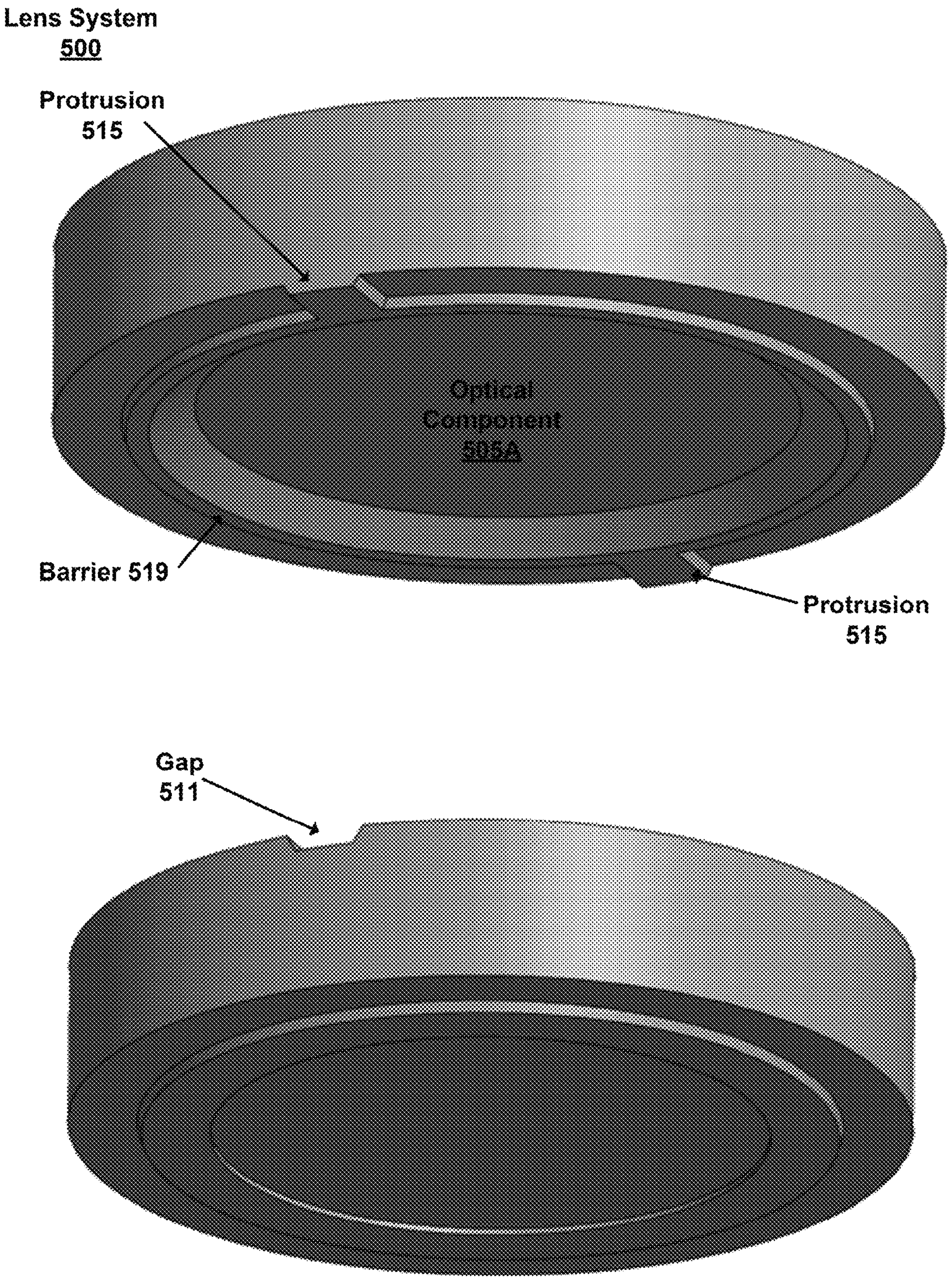

FIGS. 5A-5D (collectively referred to as FIG. 5) are diagrams of an anamorphic lens system 500 with interlocking mounting structures that span around the entire periphery of the lens components, according to some embodiments. Specifically, FIG. 5A is a perspective diagram of the lens system 500 (from an elevated perspective); FIG. 5B is a side view of the lens system 500; FIG. 5C is an exploded perspective diagram of the anamorphic lens system 500 (from an elevated perspective); FIG. 5D is another exploded perspective diagram of the anamorphic lens system 500 (from a low-angle perspective).

The lens system 500 includes a top lens 503A with an optical component 505A and a mounting structure 507A. The bottom side of the mounting structure 507A includes a barrier 519 that extends around the entire periphery of the optical component 505A. The bottom side of the mounting structure 507A also includes two protrusions 515 on opposite sides of the optical component 505A. The two protrusions 515 extend radially outward from the barrier 519 (away from the optical component 505A).

The lens system 500 also includes a bottom lens 503B with an optical component 505B and a mounting structure 507B. The top side of the mounting structure 507B includes a wall 509 that extends around the entire periphery of the optical component 505B. The top side of the mounting structure 507B also includes two gaps 511 in the wall 509 on opposite sides of the optical component 505B. Similar to the system 100, the gaps 511 are configured to receive the protrusions 515 and the wall 509 and barrier 519 are configured to engage with each other to align the optical components 505.

Figure 6:
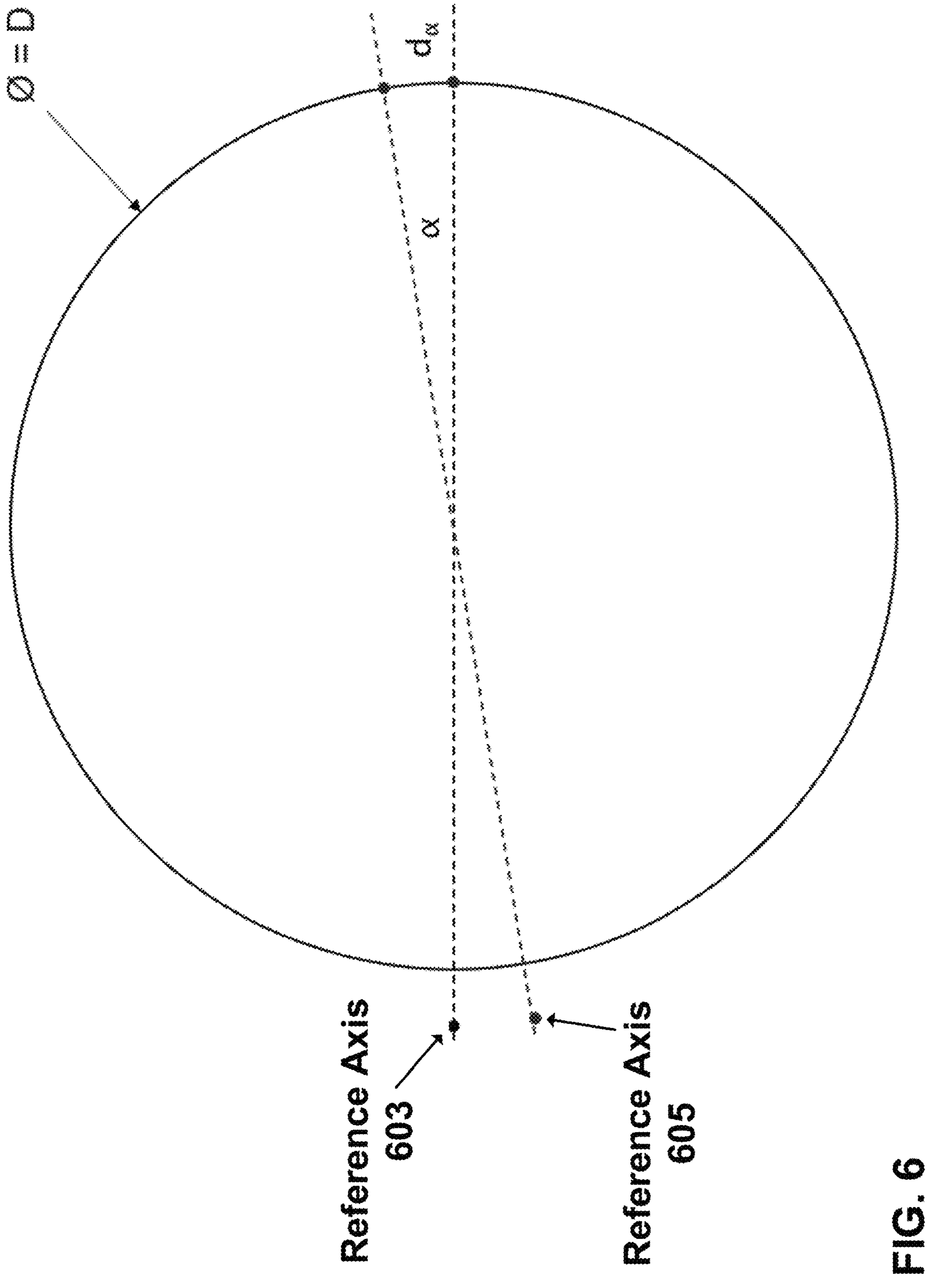
FIG. 6 is a diagram illustrating rotational misalignment between lenses in an example lens system.

FIG. 6 is a diagram illustrating example rotational misalignment between lenses in an example lens system. The references axes 603 and 605 illustrate axes that are misaligned by angle $\alpha$ (e.g., based on the asymmetric focusing surfaces of the lenses). In other words, a first lens is rotationally misaligned by angle $\alpha$ relative to a second lens. $d_\alpha$ is the arc length of the misalignment, such that $d_\alpha=\pi D(\alpha/360)$, where D is the circumference of the lens.

Figure 7A:
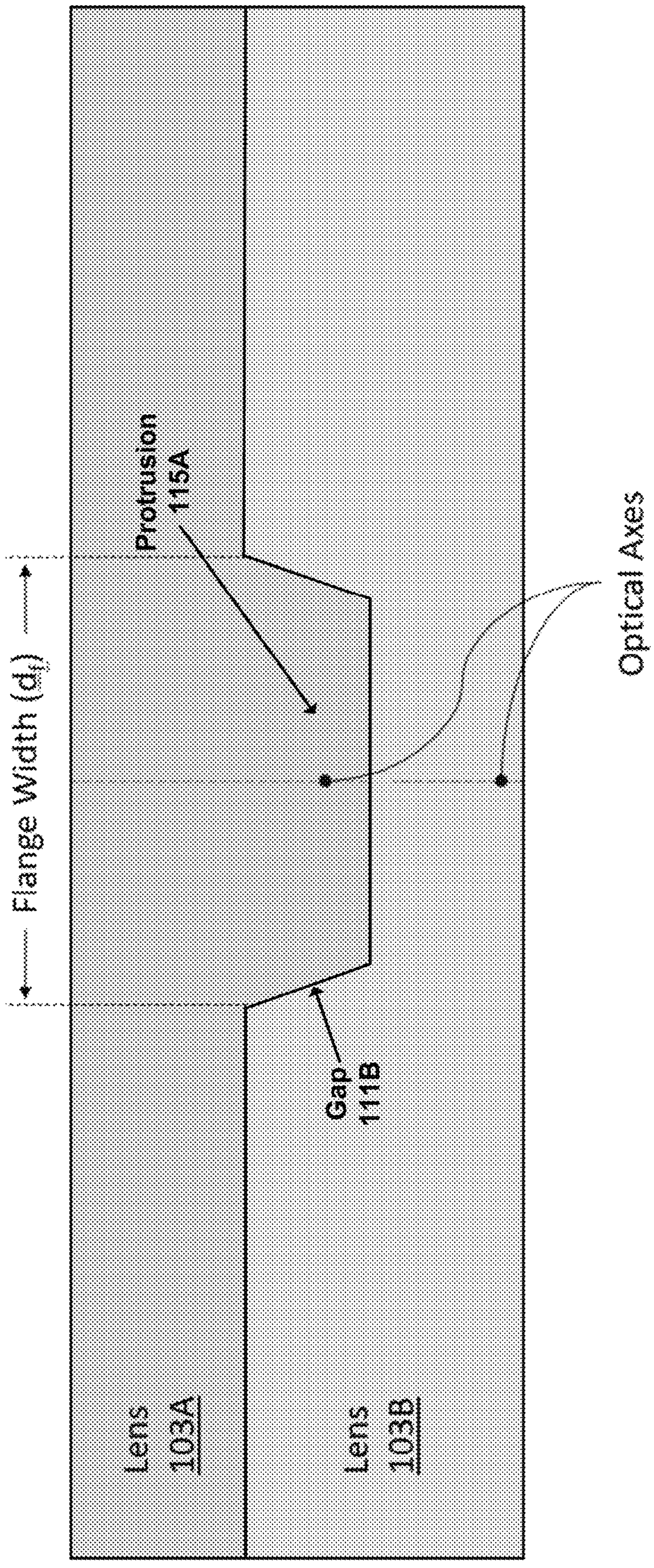
FIGS. 7A-7C are cross-sectional diagrams of the lens system of FIGS. 1A-1D illustrating example different fits for a protrusion in a gap.
Figure 7B:
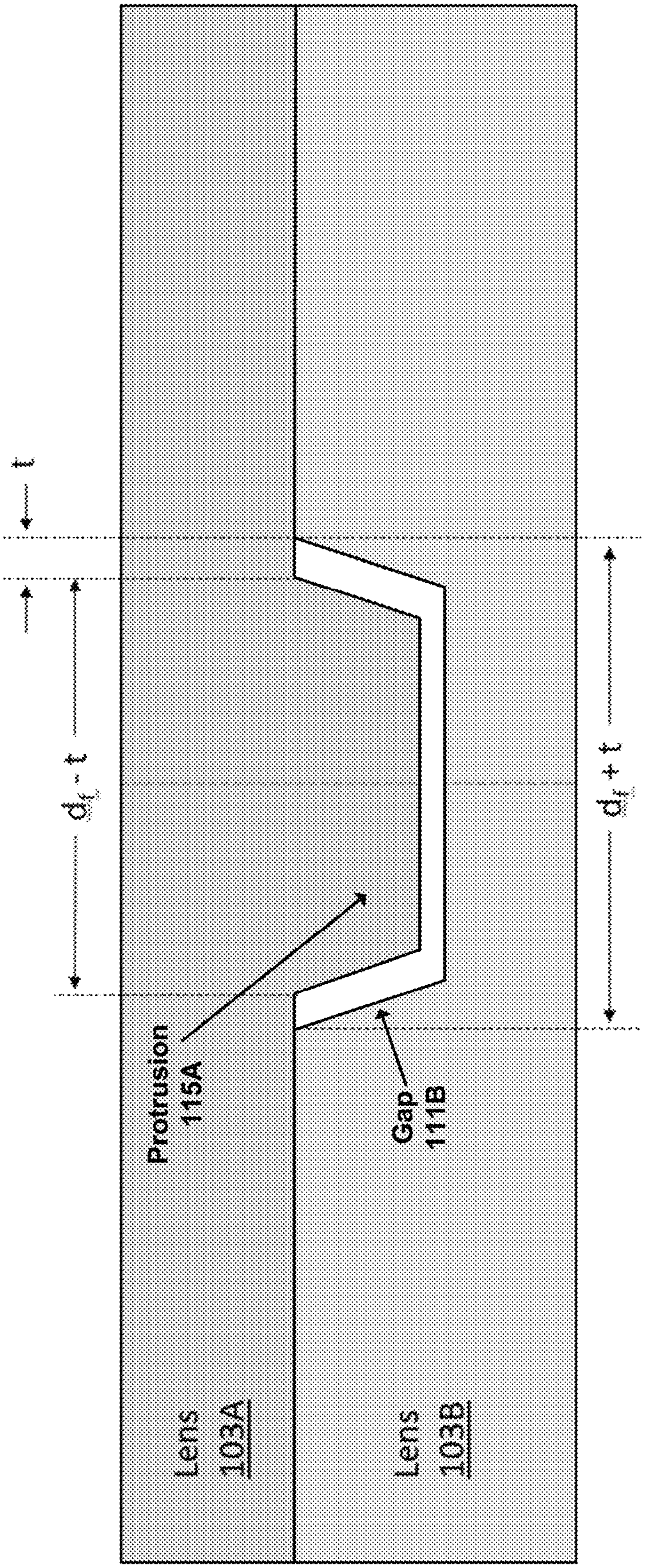
Figure 7C:
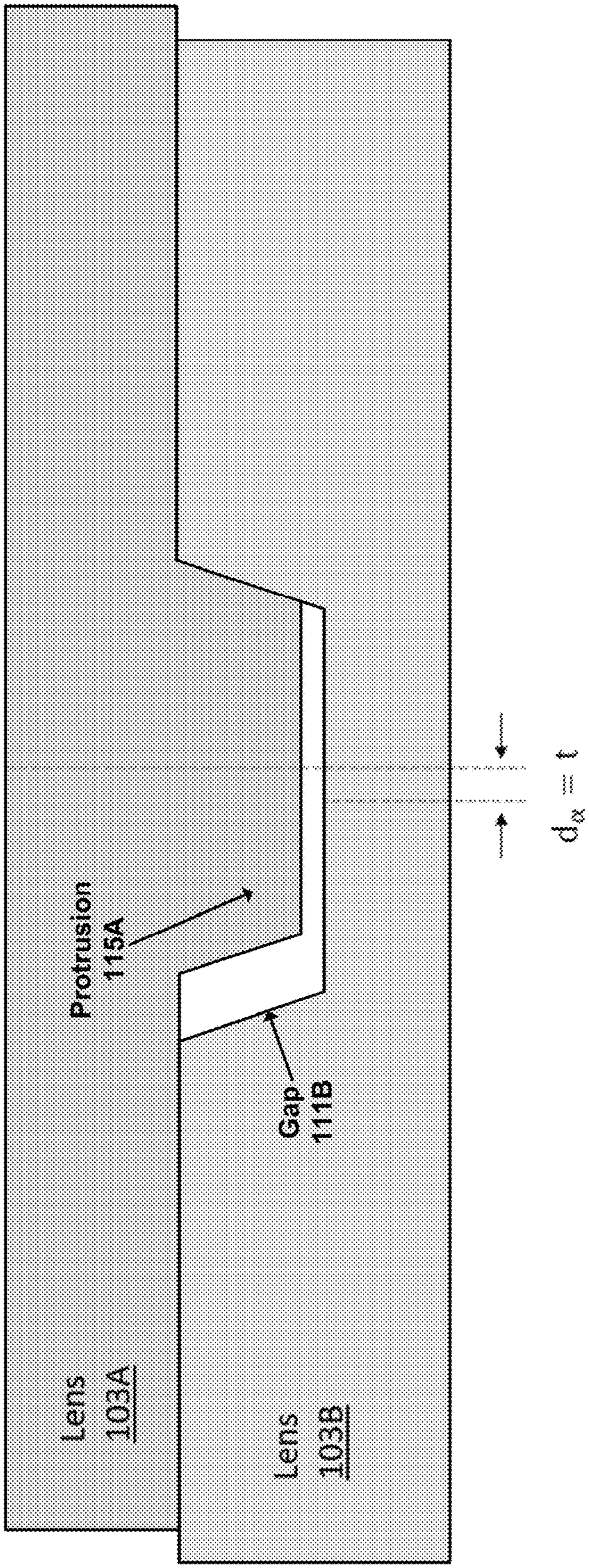

FIGS. 7A-7C (collectively referred to as FIG. 7) are cross-sectional diagrams of system 100 illustrating example different fits for protrusion 115A with gap 11B (note that the example fits in FIGS. 7A-7C are not drawn to scale. FIG. 7A illustrates a perfect fit, where the base of protrusion 115A has a width of $d_f$ and the gap 111B has a maximum width of $d_f$. FIG. 7B illustrates a less than perfect fit. More specifically, each lens was manufactured with a tolerance t. The example of FIG. 7B illustrates a hypothetical worst case scenario where lens 103A has a protrusion maximum width of $d_f-t$ and lens 103B has a maximum gap width of $d_f+t$, resulting in space between the protrusion 115A and gap 11B. Thus, FIG. 7C illustrates the maximum possible rotational misalignment between lens 103A and 103B due to manufacturing tolerances t, where the misalignment arc length $d_\alpha=t$.

In some embodiments, a lens is a unitary structure. Said differently, the optical component and the mounting structure may form a singular structure, as opposed to being separate components that are joined together (e.g., via adhesive). Additionally, or alternatively, the lens may be (e.g., uniformly) made of the same material. More specifically, the optical component and the mounting structure of a lens may be made of the same material. Example materials include polymers and glass.

To form a unitary structure lens and/or for a lens to be made of the same material, the lens may be formed by an injection molding process. For example, a material (e.g., plastic or polycarbonate) may be inserted between two molds, allowed to cool, and then separated from the two molds to form a lens. In these embodiments, to remove the material from the molds, the draft angles of the finished shape may be positive. Thus, a lens formed by an injection molding process may only have positive draft angles (e.g., by at least 2 degrees). For example, an angle of a gap corner may be 120 degrees (e.g., see $\theta$ in FIG. 1D).

Forming a lens using an injection molding process may confer several advantages. For example, injection molding processes can provide high control of the lens tolerances (deviations between the produced product and the original design) (e.g., on the scale of microns). Thus, by forming mounting structure which are part of the lenses (using injection molding), the lenses may have better alignment when they are brought together compared to conventional barrel housing techniques that use mechanical components align and hold the lenses in place. For example, a convention barrel housing configured to hold lenses in alignment may have a worse alignment by an order of magnitude.

While many of the components and features described above are in the context of FIGS. 1, 2, 5, 6 and 7, this is merely for convenience. Lens systems within the scope of this disclosure may employ various combination of components and features described above. For example, a lens system may include interlocking protrusions and gaps without including walls and barriers configured to engage each other. Furthermore, lens systems are not limited to three lenses. A lens system with interlocking mounting structures may include as few as two lenses or more than three lenses.

The following paragraphs describe additional example lens system embodiments. Letters are used to reference specific embodiments.

In an example embodiment A, an anamorphic lens system (e.g., 100 or 200) comprising: a first lens (e.g., 103B) comprising: a first optical component (e.g., 105B) having a first optical surface (e.g., 113B) with a curvature asymmetrical about an optical axis (e.g., 190); and a first mounting structure (e.g., 107B) configured to engage with a mounting structure of an adjacent lens (e.g., 103A), the first mounting structure having a first wall (e.g., 109B) on a first side and a second wall on second side, each wall having a gap (e.g., 111B), the first wall and the second wall being opposite each other on the first mounting structure; and a second lens (e.g., 103A) configured to interlock with the first lens, the second lens comprising: a second optical component (e.g., 105A) having a second optical surface (e.g., 113A) with a curvature asymmetrical about the optical axis; and a second mounting structure (e.g., 107A) configured to engage with the first mounting structure, the second mounting structure having a first barrier (e.g., 119A) with a first protrusion (e.g., 115A) and a second barrier with a second protrusion, the first barrier and the second barrier being opposite each other on the second mounting structure, the first and second protrusions positioned complementary to the gaps of the first mounting structure and configured to engage with the gaps (e.g., see FIG. 1D), engagement of the protrusions into the gaps providing passive rotational alignment of the first and second asymmetrical surfaces about the optical axis.

In an example embodiment B, the anamorphic lens system of the example embodiment A, wherein the walls of the first mounting structure are on a top portion and the first mounting structure further includes a third barrier (e.g., 119B) with a third protrusion (e.g., 115B) and a fourth barrier with a fourth protrusion, the third barrier and the fourth barrier being on a bottom portion of the first mounting structure and being opposite each other on the first mounting structure.

In an example embodiment C, the anamorphic lens system of the example embodiment B, further comprising: a third lens (e.g., 103C) configured to interlock with the first lens (e.g., 103B), the third lens comprising: a third optical component (e.g., 105C) having an optical surface (e.g., 113C) with a curvature asymmetrical about the optical axis; and a third mounting structure (e.g., 107C) configured to engage with the first mounting structure (e.g., 107B), the third mounting structure having a first wall (e.g., 109C) and a second wall, each of the first and second walls having a gap (e.g., 111C), the first wall and the second wall being opposite each other on the third mounting structure, the gaps in the first and second walls being complementary to the third and fourth protrusions on the bottom portion of the first mounting structure.

In an example embodiment D, the anamorphic lens system of example embodiment C, wherein the protrusions of the first mounting structure are configured to engage with the gaps of the third mounting structure and engagement of the protrusions of the first mounting structure into the gaps of the third mounting structure providing passive rotational alignment of the first and third asymmetrical surfaces about the optical axis.

In an example embodiment E, the anamorphic lens system of any of the above example embodiments, wherein the barriers and protrusions of the second mounting structure are on a bottom portion of the second mounting structure and the second mounting structure further includes a first wall (e.g., 109A) with a gap (e.g., 111A) and a second wall with a gap, the first wall and the second wall being on a top portion of the second mounting structure and being opposite each other on the second mounting structure.

In an example embodiment F, the anamorphic lens system of any of the above example embodiments, wherein the first mounting structure is on a periphery of the first optical component and the second mounting structure is on a periphery of the second optical component.

In an example embodiment G, the anamorphic lens system of the example embodiment F, wherein the first wall and the second wall are opposite each other across the first optical component and the first barrier and the second barrier are opposite each other across the second optical component.

In an example embodiment H, the anamorphic lens system of the example embodiment G, wherein the first and second walls each extend along the optical axis and along a periphery of the optical component.

In an example embodiment I, the anamorphic lens system of the example embodiments G and/or H, wherein the first and second barriers each extend along the optical axis and along a periphery of the second optical component.

In an example embodiment J, the anamorphic lens system of the example embodiment I, wherein the protrusions of the second mounting structure extend from the barriers inward toward the second optical component or outward away from the second optical component.

In an example embodiment K, the anamorphic lens system of the example embodiment J, wherein the protrusions of the second mounting structure extend toward each other or away from each other.

In an example embodiment L, the anamorphic lens system of any of the above example embodiments, wherein to engage the second mounting structure with the first mounting structure, the first and second walls of the first mounting structure are configured to engage with the first and second barriers of the second mounting structure (e.g., see FIG. 1A).

In an example embodiment M, the anamorphic lens system of the example embodiment L, wherein to engage the first and second walls of the first mounting structure with the first and second barriers of the second mounting structure, outer surfaces of the first and second walls are configured to engage with inner surfaces of the first and second barriers.

In an example embodiment N, the anamorphic lens system of the example embodiment M, wherein engagement of outer surfaces of the first and second walls with inner surfaces of the first and second barriers provides alignment of the first and second lenses along axes substantially perpendicular to the optical axis.

In an example embodiment O, the anamorphic lens system of any of the above example embodiments, where engagement of the protrusions with the gaps is configured to prevent rotation of the first lens relative to the second lens about the optical axis.

In an example embodiment P, the anamorphic lens system of any of the above example embodiments, wherein the first mounting structure and the first optical component are made of the same material.

In an example embodiment Q, the anamorphic lens system of any of the above example embodiments, wherein the second mounting structure and the second optical are made of the same material.

In an example embodiment R, the anamorphic lens system of any of the above example embodiments, wherein the first mounting structure and the first optical component form a singular structure.

In an example embodiment S, the anamorphic lens system of any of the above example embodiments, wherein the first lens and the second lens are in direct physical contact with each other (e.g., see FIGS. 1A and 1D).

In an example embodiment T, the anamorphic lens system of any of the above example embodiments, wherein the first lens and the second lens only have positive draft angles.

Additional advantages of the embodiments described above may include: (1) enhanced optical performance due to improved lens alignment; (2) increased optical performance predictability due to fewer variables in lens construction; (3); reduced manufacturing errors related to lens misalignment; (4) simplified lens assembly processes; (5) increased durability as the interlocking mechanical structures can reduce mechanical stresses on the lenses during assembly; (6) increased optical performance of the lens system due to reduced spaced used for lens element mechanical alignment, thus resulting in increased space for optical surfaces; or (7) some combination thereof.

The lens systems with interlocking mounting structures described above may be implemented for any lens system where precise rotational or lateral alignment is beneficial (the lens system doesn't need to anamorphic). For example, lenses with interlocking mounting structures may be used for phone cameras, wearable glasses, augmented reality or virtual reality headsets, and portable cameras. The next section describes an example mobile device 303 that may use lenses with interlocking mounting structures (e.g., in the lens module 307).

Example Imaging Systems

Figure 3A:
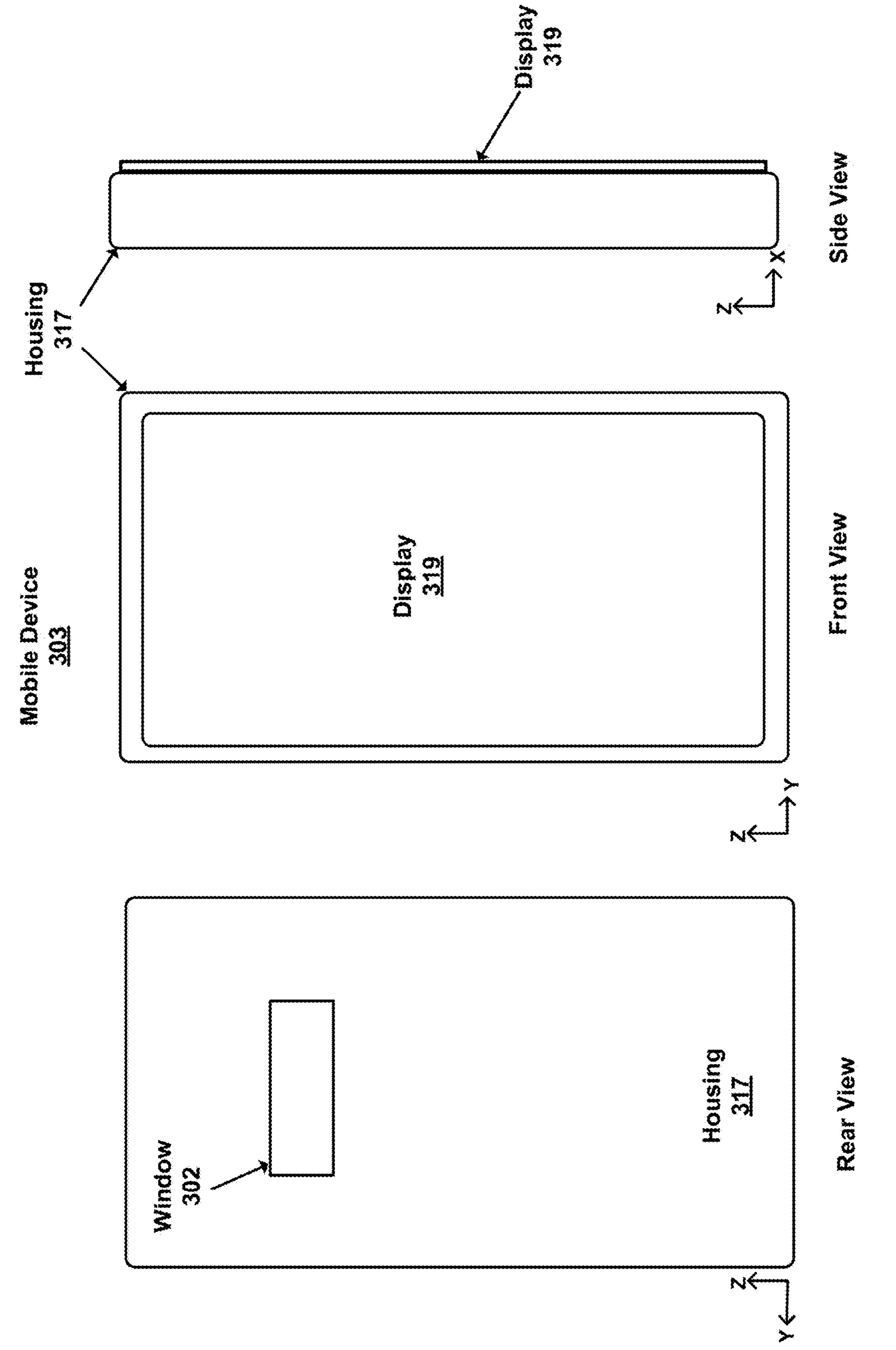
FIGS. 3A and 3B illustrate an imaging system contained in a mobile device, according to one or more embodiments.
Figure 3B:
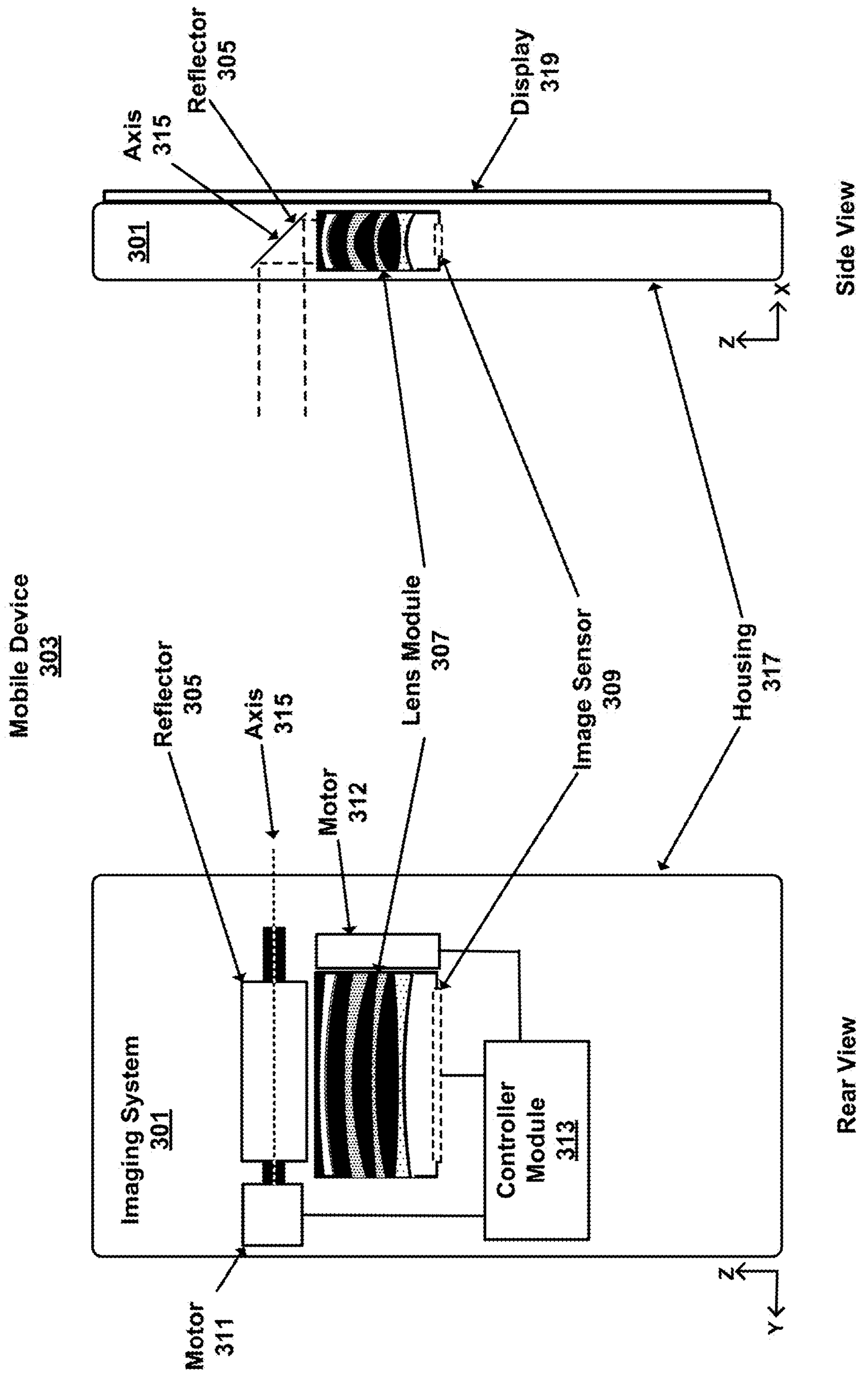

FIGS. 3A-3B illustrate an example imaging system 301 contained in an example mobile device 303, according to an embodiment. Specifically, FIG. 3A illustrates a front, rear, and side view of the mobile device 303, and FIG. 3B illustrates a cross-sectional rear view and cross-sectional side view of the mobile device 303. The mobile device 303 includes the imaging system 301, a housing 317 with a window 302, and a display 319. The imaging system 301 includes a rotatable reflector 305, a motor 311, a motor 312, a lens module 307 (also referred to as a lens design), an image sensor 309, and a controller module 313.

The reflector 305 directs light passing through the window 302 downward towards the lens module 307. The lens module 307 focuses light onto the image sensor 309. The motor 311 rotates the reflector 305 about axis 315, which is substantially parallel (e.g., within a degree or two) to the image sensor plane. Rotating the reflector 305 allows the reflector 305 to direct light from different portions of the external environment towards the image sensor 309. The controller 313 is electrically coupled to the image sensor 309 and the motor 311. To form an image of the external environment, the imaging system 301 captures images of portions of a view of the external environment while rotating the reflector 305. The rotation of the reflector 305 from an initial angular position to a final angular position may be referred to as a scan. The sequence of captured images contains information of several adjacent portions of the environment and, after combining (e.g., stitching or fusing) the images together, the imaging system 301 forms a larger image of the external environment with a predetermined aspect ratio.

The housing 317 contains one or more of the components of the imaging system 301. Locations and orientations of the imaging system components may be described relative to the housing 317 and a housing window 302. For example, the housing 317 is defined by multiple walls that contain the imaging system 301, and one of the walls includes a housing window 302 with a plane, for example, defined by a boundary of the window 302. The plane may be parallel to an yz- (or yz-) plane in a three-dimensional reference system. The housing 317 may have a low profile along an axis perpendicular to the plane of the window 302 (e.g., along the x-axis). The length of the housing along the x-axis may be referred to as the thickness of the housing 317 and may range from, for example, 5 to 15 millimeters. In embodiments where the housing 317 is part of a mobile device 303, the window plane may be parallel to a display 319 of the mobile device 303. Unlike conventional imaging systems, the image sensor surface does not face the window plane. For example, the image sensor surface is perpendicular to the window plane (e.g., parallel to the xy-plane) and is outside the boundary of the window 302. Due to this, the reflector 305 may be aligned with the window 302 to direct light propagating through the window 302 to the image sensor plane. The lens module 307 may be between the reflector 305 and the image sensor 309. An aperture plane may be between the reflector 305 and the lens module 307 and may be perpendicular to the window plane and parallel to the image sensor plane. The reflector allows the optical path of the imaging system 301 to be folded into the yz-plane. This folding allows the optical path to increase beyond the limit of the housing's thickness and into the housing's width (e.g., length along the y-axis) and height (e.g., length along the z-axis), which are typically larger than its thickness. Thus, the reflector, the image sensor, and/or an aperture of the lens module 307 may have aspect ratios that are not 1:1, and their long axes may be parallel to each other.

The image sensor 309 is an imaging device that captures images of portions of the external environment. Examples of the image sensor 309 include a CCD sensor and a CMOS sensor. As illustrated in FIG. 3, the image sensor surface may lie in the xy-plane relative to an xy-plane of the mobile device 303 and the image sensor surface faces in a perpendicular direction (along the z-axis) from the xy-planar surface. Due to this positioning, the sensor plane of the image sensor 309 does not face the view of the external environment. By placing the image sensor 309 in the xy-plane, the size of the image sensor 309 can be larger than image sensors in conventional cameras. The smaller dimension of the image sensor plane (along the x-axis) may be limited by the mobile device thickness while the longer dimension (along the y-axis) may be limited by the mobile device width, which may be many centimeters long. This allows the image sensor 309 to have a high aspect ratio, such as ratio greater than 17:9 (e.g., 1:10). Conventional cameras produce image of scenes with aspects ratios that are not as high (e.g., sensors that are limited to 2:3, 3:4, or 16:9). Due to the high aspect ratio of the image sensor 309, the image sensor 309 may create narrow images ("image strips") that correspond to a narrow view of the scene. For conventional imaging systems in mobile devices, the size of the image sensor may be limited by the focal length of the camera lens. However, by changing the location and orientation of the image sensor 309 as described herein, the image sensor size may be larger than image sensors in conventional imaging systems with a same or similar housing.

As described above, the reflector 305 (also referred to as a scanning mirror) is an optical component that rotates about axis 315 to direct light to the image sensor 309. Generally, axis 315 is substantially parallel to a long dimension of the image sensor plane and the reflector 305 is centered on window 302. If the plane of the window 302 (e.g., the yz-plane) is perpendicular to the plane of the image sensor 309 (e.g., the xy-plane), the reflector 305 may direct light at around a 45-degree position relative to the image sensor plane to direct light towards the image sensor 309. Due to the high aspect ratio of the image sensor 309, the reflector 305 may also have a high aspect ratio to ensure light is reflected to the entire surface of the image sensor 309. The reflector 305 is illustrated in FIG. 3B as having a rectangular plane, however other shapes are possible, such as concave or convex shapes (e.g., which may be used to expand or shrink the field of view).

The reflector 305 is described herein in terms of 'directing' light, however this is for ease of description. The reflector 305 may optically direct, widen, slim, reflect, diffract, refract, disperse, amplify, reduce, combine, separate, polarize, or otherwise change properties of the light as it propagates in the imaging system 301. To do this, the reflector 305 may include reflective coatings, metalized features, optical gratings, mirrors, prismatic structures, Fresnel structures, corner reflectors, retroreflectors, and the like on one or more of its surfaces.

The lens module 307 includes one or more optical components (e.g., lenses 103) and is designed to form an image on the image sensor 309. The lens module 307 may spread, focus, redirect, and otherwise modify the light passing through it. The lens module 307 may be as simple as a single lens or it may include additional optical components, such as diffusers, phase screens, beam expanders, mirrors, and lenses (e.g., anamorphic lenses). In some embodiments, the entrance pupil of the lens module 307 is adjacent to the reflector 305. This may allow the reflector 305 to have a smaller size. In some embodiments, the lens module 307 include a non-symmetrical aperture with one large and one small axis (stretching an axis may be used in devices that have dimension constrains, like smartphones, and in those cases the aperture can be much larger if it isn't symmetrical).

Because of the high aspect ratio of the image sensor 309, the lens module 307 may be designed and manufactured to be non-circular or non-symmetric and follow the dimension of the image sensor 309 in the terms of its aperture. Using a lens module 307 with a non-symmetrical aperture may allow it to fit in the mobile device housing 317. Furthermore, the focal length of the lens module 307 may be different in the x- and y-directions. In some embodiments, this results in the imaging system 301 not preserving the aspect ratio, so, for example, a 4:3 scene may be imaged by an image sensor that is 8:3. One or more of the optical components of the lens module 307 may have surfaces with cylindrical symmetry but the apertures of other components may be rectangular or another elongated shape. The lens module 307 may be manufactured using wafer level technology, which may be beneficial in creating rectangular shaped optical components by dicing lens surfaces in the desired aspect ratio. In some embodiments, the lens module 307 is manufactured using injection molding technology by creating molds that have non-symmetrical apertures. The components of the lens module 307 may be glass or plastic injection molded or machined (e.g., via wafer level technology).

The motor 312 is controlled by controller 313 and is configured to move the lens module or one or more optical components of the lens module 307. For example, the motor 312 moves one or more optical lenses along the optical axis to focus light onto the sensing plane of the image sensor 309. The imaging system may include multiple motors 312, for example, if multiple optical components should be moved separately or by different amounts. The motor 312 may include one or more actuator type mechanisms, galvanometer type mechanisms, mems type mechanisms, motorized type mechanisms, or stepper motor type mechanisms. The motor 312 may also be referred to as a lens shift mechanism.

As stated above, the motor 311 rotates the reflector 305 around axis 315. To do this, the motor 311 may include one or more actuator type mechanisms, galvanometer type mechanisms, mems type mechanisms, motorized type mechanisms, or stepper motor type mechanisms. In some embodiments, as further described below, the motor 311 can move the reflector 305 in other directions. For example, the motor 311 can translationally and/or rotationally move the reflector 305 along the x, y, and/or z-axes.

In some embodiments, motor 311 tilts the reflector 305 (e.g., by a few degrees in either direction) to compensate for motion (e.g., hand motion) while the image sensor 309 is capturing an image of a portion of the scene. For example, if a user tilts the mobile device 303 slightly downward, the motor may tilt the reflector 305 upward to compensate for the motion so that the image sensor 309 receives a same portion of the scene despite the tilting. In some embodiments, the imaging system 301 includes a sensor shift mechanism (e.g., another motor) to shift the image sensor 309 in one or more directions (e.g., in the xy-plane) to compensate for this motion. In some embodiments, the imaging system 301 includes motor 312 to shift the lens module 307 (or a component of it) in one or more directions (e.g., in the xy-plane) to compensate for this motion. If the imaging system 301 includes multiple motion compensating mechanisms, the controller 313 may coordinate the multiple mechanisms to work in conjunction to offset motion. For example, the motor 311 tilts the reflector 305 to compensate for motion in one direction and a sensor shift mechanism or a lens shift mechanism (e.g., 312) compensates for motion in another direction. In some embodiments, the reflector 305 rotates about multiple substantially perpendicular axes (e.g., the x-axis and z-axis) to compensate for motion (e.g., instead of a sensor or lens shift mechanism).

The motor 311 and shift mechanisms (e.g., 312) may also act as auto focusing mechanisms. For example, a lens shift mechanism shifts the lens module 307 (or a component of it) closer to or farther away from the image sensor 309 (e.g., along the z-axis) to achieve the desired focus. In another example, a sensor shift mechanism shifts the image sensor 309 closer to or farther away from the lens module 307 (e.g., along the z-axis) to achieve the desired focus.

The controller module 313 may constitute software (e.g., program code embodied on a machine-readable medium and executable by a processing system to have the processing system operate in a specific manner) and/or hardware to provide control signals (also referred to as adjustment signals) to the motor 311, motor 312, image sensor 309, or some combination thereof. Thus, the controller 313 may: (1) rotate the reflector 305 via motor 311 to direct light from different portions of the external environment towards the image sensor 309, (2) focus light on the image sensor 309 by adjusting optical components of the lens module 307 via motor 312, (3) synchronize the image sensor 309 with the reflector 305 to capture images of the different portions of the environment, or (4) some combination thereof. Additionally, the controller 313 may receive the captured images and combine them to form a lager continuous image of the external environment.

In some embodiments, the imaging system 301 includes one or more motion sensors (e.g., accelerometers, gyroscopes, etc.) to track motion of the imaging system relative to the external environment. The controller module 313 may receive motion data from the motion sensors. If the determined motion is above a threshold amount, the module 313 may provide instructions to the motor 311 and/or a sensor shift mechanism to compensate for the motion.

In some embodiments, the imaging system 301 is not contained in the mobile device 303. For example, the imaging system 301 is contained in a standalone device, such as a case for the mobile phone 303.

Figure 4A:
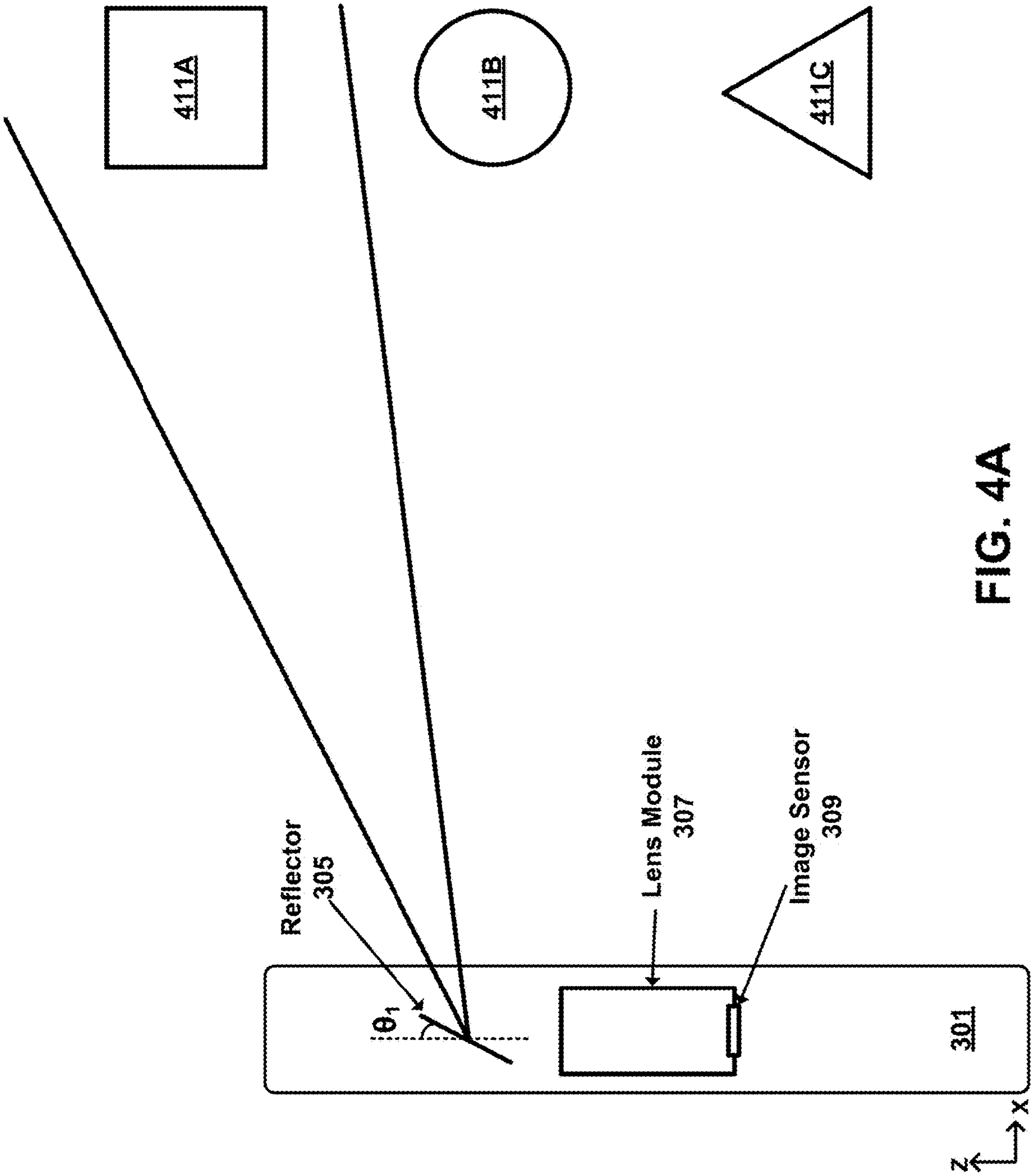
FIGS. 4A-4C illustrate the imaging system capturing images of different portions of a view of an external environment, according to one or more embodiments.
Figure 4B:
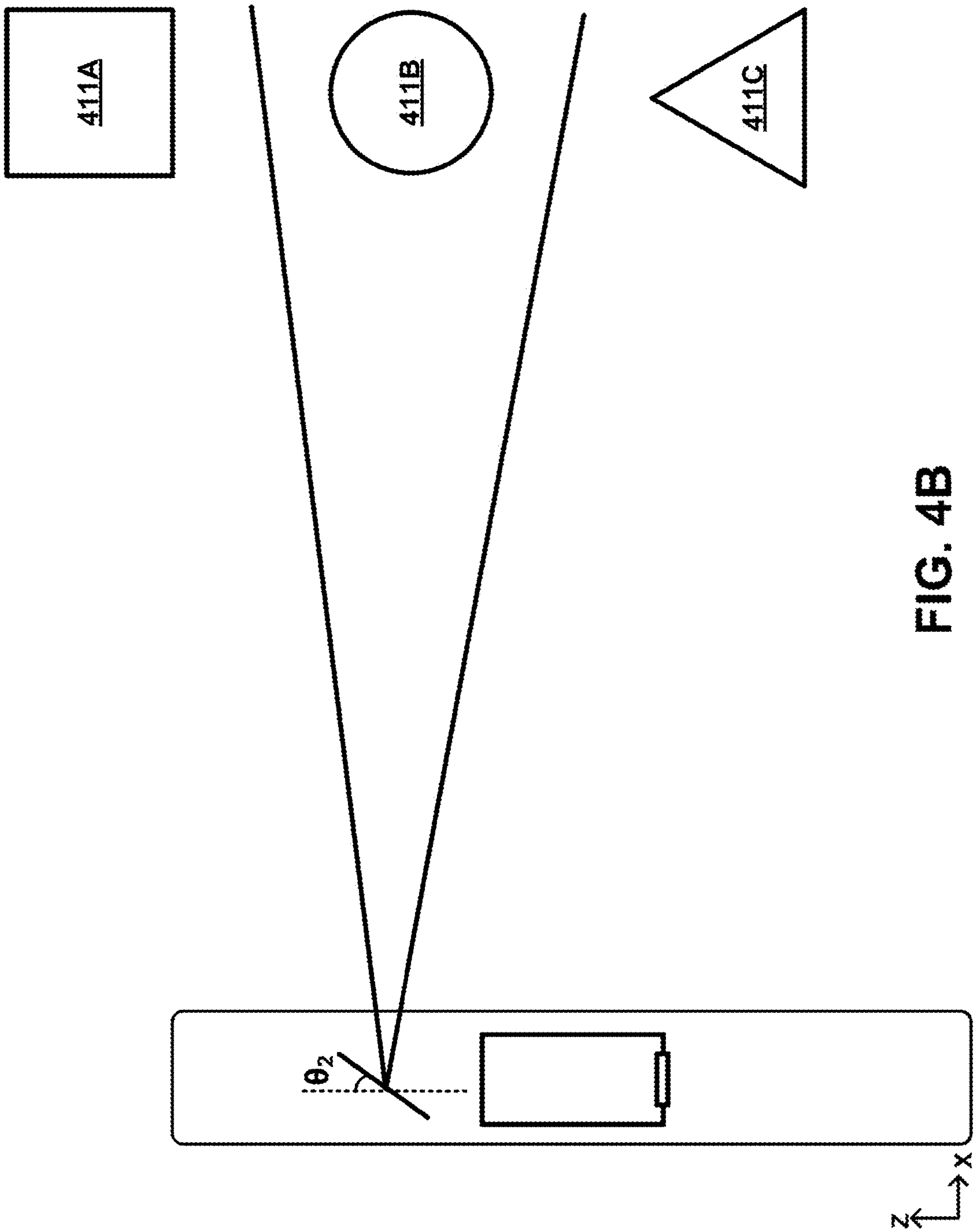
Figure 4C:
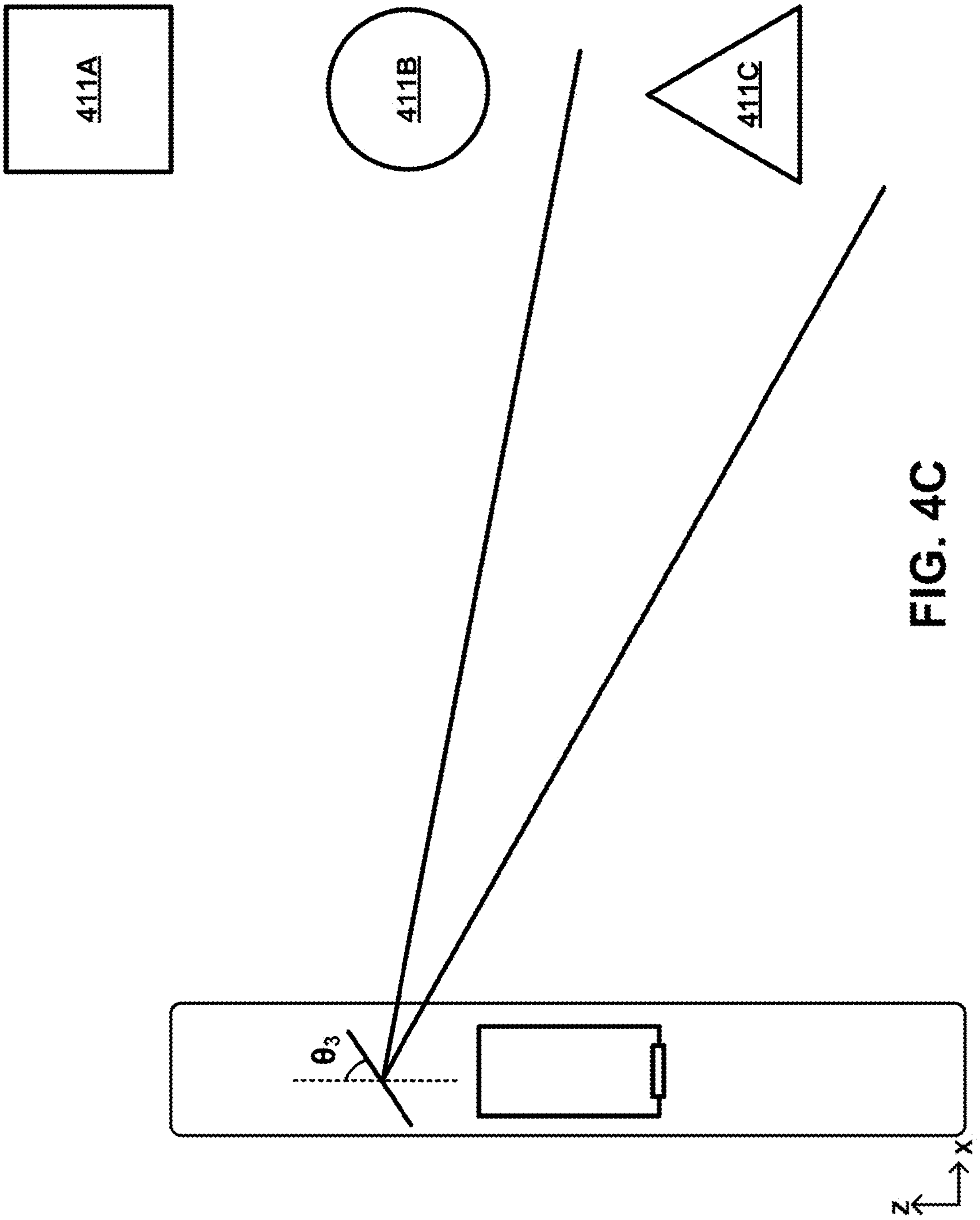

FIGS. 4A-4C illustrate the imaging system 301 capturing images of different portions of a view of an external environment, according to an embodiment. In the example of FIGS. 4A-4C, the external environment includes one or more objects within a field of view. In this example, for ease of discussion, the objects are a cube 411A, a sphere 411B, and a pyramid 411C that are vertically aligned. In FIG. 4A, the reflector 305 is tilted at a first rotational position (e.g., it forms angle $\theta_1$ relative to the yz-plane) to direct light from the top portion of the external environment towards the image sensor 309. Thus, the image sensor 309 captures an image of the cube 411A. In FIG. 4B, the reflector is tilted at a second rotational position (e.g., it forms angle $\theta_2>\theta_1$ relative to the yz-plane) to direct light from the middle portion of the external environment toward the image sensor 309. Thus, the image sensor 309 captures an image of the sphere 411B. In FIG. 4C, the reflector is tilted at a third rotational position (e.g., it forms angle $\theta_3>\theta_2$ relative to the yz-plane) to direct light from the bottom portion of the external environment toward the image sensor 309. Thus, the image sensor 309 captures an image of the pyramid 411C. In some example embodiments, to capture a set of images, the reflector angles $\theta$ may range symmetrically around the 45 degree position (e.g., from 25-65 degrees) relative to the xy-plane.

Figure 4D:
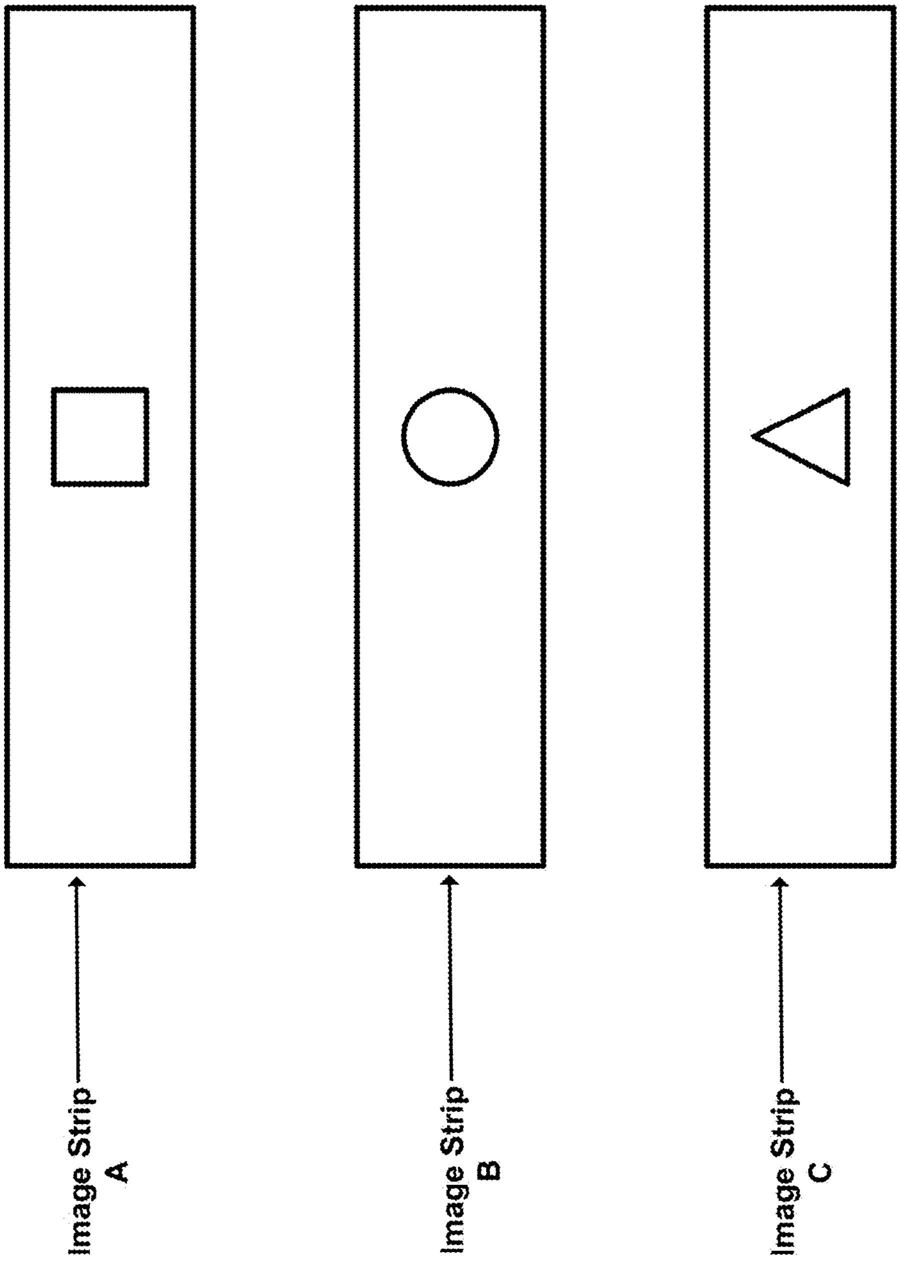
FIG. 4D illustrates the images of the portions of the view, according to one or more embodiments.

FIG. 4D illustrates three image strips that were captured by the image sensor 309, according to an embodiment. Each image strip is an image of a different portion of the external environment due to each strip being captured while the reflector 305 was in a different rotational position. The image strips have high aspect ratios due to the high aspect ratio of the reflector 305, lens module 307, and image sensor 309. Image strip A is an image of the cube 411A and was captured by the image system 301 in FIG. 4A. Image strip B is an image of the sphere 411B and was captured by the image system 301 in FIG. 4B. Image strip C is an image of the pyramid 411C and was captured by the image system 301 in FIG. 4C.

The exposure time to capture each image strip may be limited by user motion (the user unintentionally moving the device 303 as they hold it) and by objects moving in the scene. Additionally, the total exposure time of the image strips may be limited by possible changes in the external environment between the capturing of image strips. The image strip exposure times and the total exposure time may be limited to predetermined threshold times or determined dynamically (e.g., based on an amount of movement of the mobile device 303).

Figure 4E:
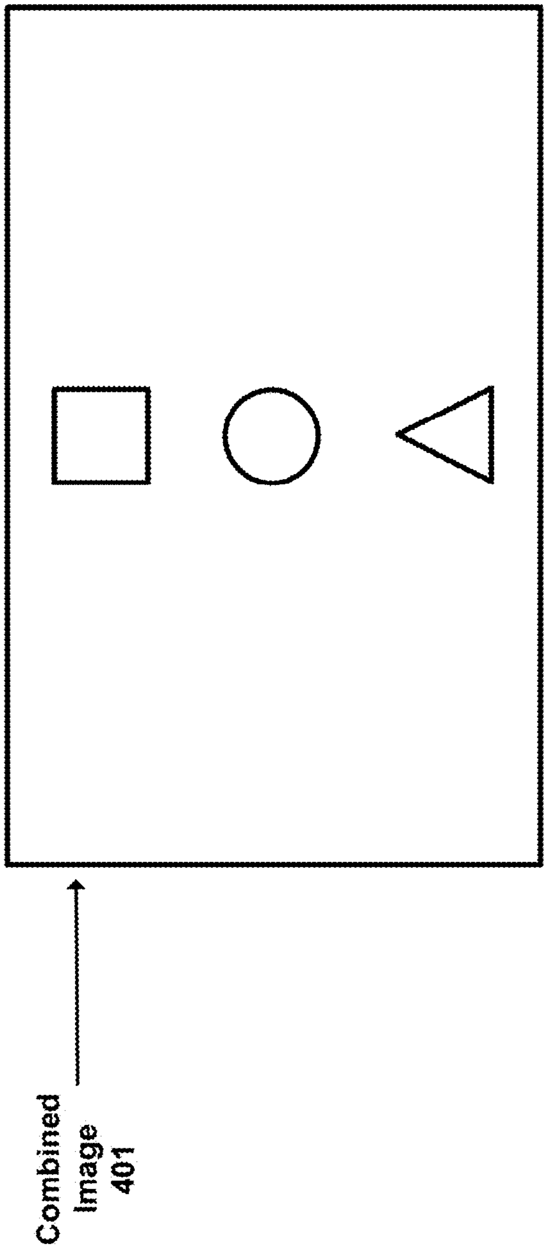
FIG. 4E illustrates an image of the view of the external environment formed from the images in FIG. 4D, according to one or more embodiments.

FIG. 4E illustrates an image 401 of a view of the external environment, according to an embodiment. The image 401 is formed by combining (e.g., fusing or stitching) image strips A-C illustrated in FIG. 4D. The combined image 401 may be referred to as a composite image. The horizontal field of view of the combined image 401 may be based on the width (along the y-axis) of the window 302, reflector 305, lens module 307 (e.g., its aperture), and/or image sensor 309, and the vertical field of view of the combined image 401 may be based on the scanning range of the reflector 305. Typically, the vertical field of view is larger than the horizontal field of view.

Depending on the position of the reflector 305 when image strips are captured, the image strips may have some overlap with each other (e.g., 10-300 rows of pixels). Capturing image strips with overlap may help ensure that the image strips are not missing portions of a view of the environment (e.g., so that the entire view is captured) and may reduce the noise value of the combined image 401. Capturing image strips with overlap may also assist the combination process to ensure the image strips are combined properly. For example, the controller 313 uses overlapping portions to align the image strips during the combination process. In another example, if objects in the environment move between the capturing of image strips or if the mobile device 303 moves between the capturing of image strips, the control system 301 may use the overlapping portions to correct for artifacts caused by this movement.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, the controller module 113. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment," "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for forming a combined image through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An anamorphic lens system comprising:

a first lens comprising:

a first optical component having a first optical surface with a curvature asymmetrical about an optical axis; and a first mounting structure configured to engage with a mounting structure of an adjacent lens, the first mounting structure having a first wall on a first side and a second wall on second side, each wall having a gap, the first wall and the second wall being opposite each other on the first mounting structure; and a second lens configured to interlock with the first lens, the second lens comprising:

a second optical component having a second optical surface with a curvature asymmetrical about the optical axis; and a second mounting structure configured to engage with the first mounting structure, the second mounting structure having a first barrier with a first protrusion and a second barrier with a second protrusion, the first barrier and the second barrier being opposite each other on the second mounting structure, the first and second protrusions positioned complementary to the gaps of the first mounting structure and configured to engage with the gaps, engagement of the protrusions into the gaps providing passive rotational alignment of the first and second asymmetrical surfaces about the optical axis, wherein the first and second walls each extend along the optical axis in a first direction, the first and second barriers each extend along the optical axis in a second direction opposite the first direction, wherein an outer surface of the first wall is configured to contact an inner surface of the first barrier and the first protrusion extends from the inner surface of the first barrier toward the optical axis to engage with the gap of the first wall, wherein the inner surface of the first barrier faces the optical axis and the outer surface of the first wall faces away from the optical axis.

2. The anamorphic lens system of claim 1, wherein the walls of the first mounting structure are on a top portion and the first mounting structure further includes a third barrier with a third protrusion and a fourth barrier with a fourth protrusion, the third barrier and the fourth barrier being on a bottom portion of the first mounting structure and being opposite each other on the first mounting structure.

3. The anamorphic lens system of claim 2, further comprising:

a third lens configured to interlock with the first lens, the third lens comprising:

a third optical component having an optical surface with a curvature asymmetrical about the optical axis; and a third mounting structure configured to engage with the first mounting structure, the third mounting structure having a first wall and a second wall, each of the first and second walls having a gap, the first wall and the second wall being opposite each other on the third mounting structure, the gaps in the first and second walls being complementary to the third and fourth protrusions on the bottom portion of the first mounting structure.

4. The anamorphic lens system of claim 3, wherein the protrusions of the first mounting structure are configured to engage with the gaps of the third mounting structure and engagement of the protrusions of the first mounting structure into the gaps of the third mounting structure providing passive rotational alignment of the first and third asymmetrical surfaces about the optical axis.

5. The anamorphic lens system of claim 1, wherein the barriers and protrusions of the second mounting structure are on a bottom portion of the second mounting structure and the second mounting structure further includes a first wall with a gap and a second wall with a gap, the first wall and the second wall being on a top portion of the second mounting structure and being opposite each other on the second mounting structure.

6. The anamorphic lens system of claim 1, wherein the first mounting structure is on a periphery of the first optical component and the second mounting structure is on a periphery of the second optical component.

7. The anamorphic lens system of claim 6, wherein the first wall and the second wall are opposite each other across the first optical component and the first barrier and the second barrier are opposite each other across the second optical component.

8. The anamorphic lens system of claim 7, wherein the first and second walls each extend along a periphery of the first optical component.

9. The anamorphic lens system of claim 7, wherein the first and second barriers each extend along a periphery of the second optical component.

10. The anamorphic lens system of claim 9, wherein the protrusions of the second mounting structure extend from the barriers inward toward the second optical component.

11. The anamorphic lens system of claim 10, wherein the protrusions of the second mounting structure extend toward each other.

12. The anamorphic lens system of claim 1, wherein to engage the second mounting structure with the first mounting structure, the first and second walls of the first mounting structure are configured to engage with the first and second barriers of the second mounting structure.

13. The anamorphic lens system of claim 12, wherein to engage the first and second walls of the first mounting structure with the first and second barriers of the second mounting structure, outer surfaces of the first and second walls are configured to engage with inner surfaces of the first and second barriers.

14. The anamorphic lens system of claim 13, wherein engagement of outer surfaces of the first and second walls with inner surfaces of the first and second barriers provides alignment of the first lens and the second lens along axes substantially perpendicular to the optical axis.

15. The anamorphic lens system of claim 1, where engagement of the protrusions with the gaps is configured to prevent rotation of the first lens relative to the second lens about the optical axis.

16. The anamorphic lens system of claim 1, wherein the first mounting structure and the first optical component are made of a same material.

17. The anamorphic lens system of claim 1, wherein the second mounting structure and the second optical component are made of a same material.

18. The anamorphic lens system of claim 1, wherein the first mounting structure and the first optical component form a unitary structure.

19. The anamorphic lens system of claim 1, wherein the first lens and the second lens are in direct physical contact with each other.

20. The anamorphic lens system of claim 1, wherein the first lens and the second lens only have positive draft angles.

* * * * *